(12) United States Patent
Draht et al.

(10) Patent No.: US 10,589,341 B2
(45) Date of Patent: Mar. 17, 2020

(54) MULTI-STEP JOINING DEVICE AND JOINING METHOD THEREFOR

(71) Applicant: BÖLLHOFF VERBINDUNGSTECHNIK GmbH, Bielefeld (DE)

(72) Inventors: Torsten Draht, Schloß Holte-Stukenbrock (DE); Andre Kleinemeier, Verl (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 106 days.

(21) Appl. No.: 15/928,280

(22) Filed: Mar. 22, 2018

(65) Prior Publication Data

US 2018/0272419 A1    Sep. 27, 2018

(30) Foreign Application Priority Data

Mar. 24, 2017  (DE) .................. 10 2017 106 449

(51) Int. Cl.
  *B21J 15/26*   (2006.01)
  *B21J 15/28*   (2006.01)
  (Continued)

(52) U.S. Cl.
  CPC ............ *B21J 15/28* (2013.01); *B21D 39/031* (2013.01); *B21J 15/025* (2013.01); *B21J 15/10* (2013.01);
  (Continued)

(58) Field of Classification Search
  CPC . B21J 15/28; B21J 15/025; B21J 15/20; B21J 15/26; B21J 15/10; B21J 15/285;
  (Continued)

(56) References Cited

U.S. PATENT DOCUMENTS 6,676,000 B2    1/2004  Lang et al.
6,725,521 B1    4/2004  Blacket et al.
(Continued)

FOREIGN PATENT DOCUMENTS

CN    2472862 Y    1/2002
CN    201324812 Y   10/2009
(Continued)

OTHER PUBLICATIONS

EP Extended Search Report for EP Application No. 18162048.5 dated Aug. 8, 2018 (6 pages).

(Continued)

*Primary Examiner* — Sarang Afzali
*Assistant Examiner* — Ruth G Hidalgo-Hernandez
(74) *Attorney, Agent, or Firm* — Reising Ethington P.C.

(57) ABSTRACT

A joining device, in particular a self-piercing rivet tool, is disclosed that is operated with the assistance of different drive steps. These drive steps comprise at least one movement step with a fast punch speed, and a power step with a low punch speed and strong punch force. In combination with the joining device, a clamping device module is use that, based on the at least one spring in the clamping device module, generates discernible threshold values in the force/punch path diagram, with the assistance of which a switchover between different drive steps of the joining device is activated. Moreover, the present disclosure relates to a joining method for the above-described joining device.

20 Claims, 14 Drawing Sheets

Figure 1:
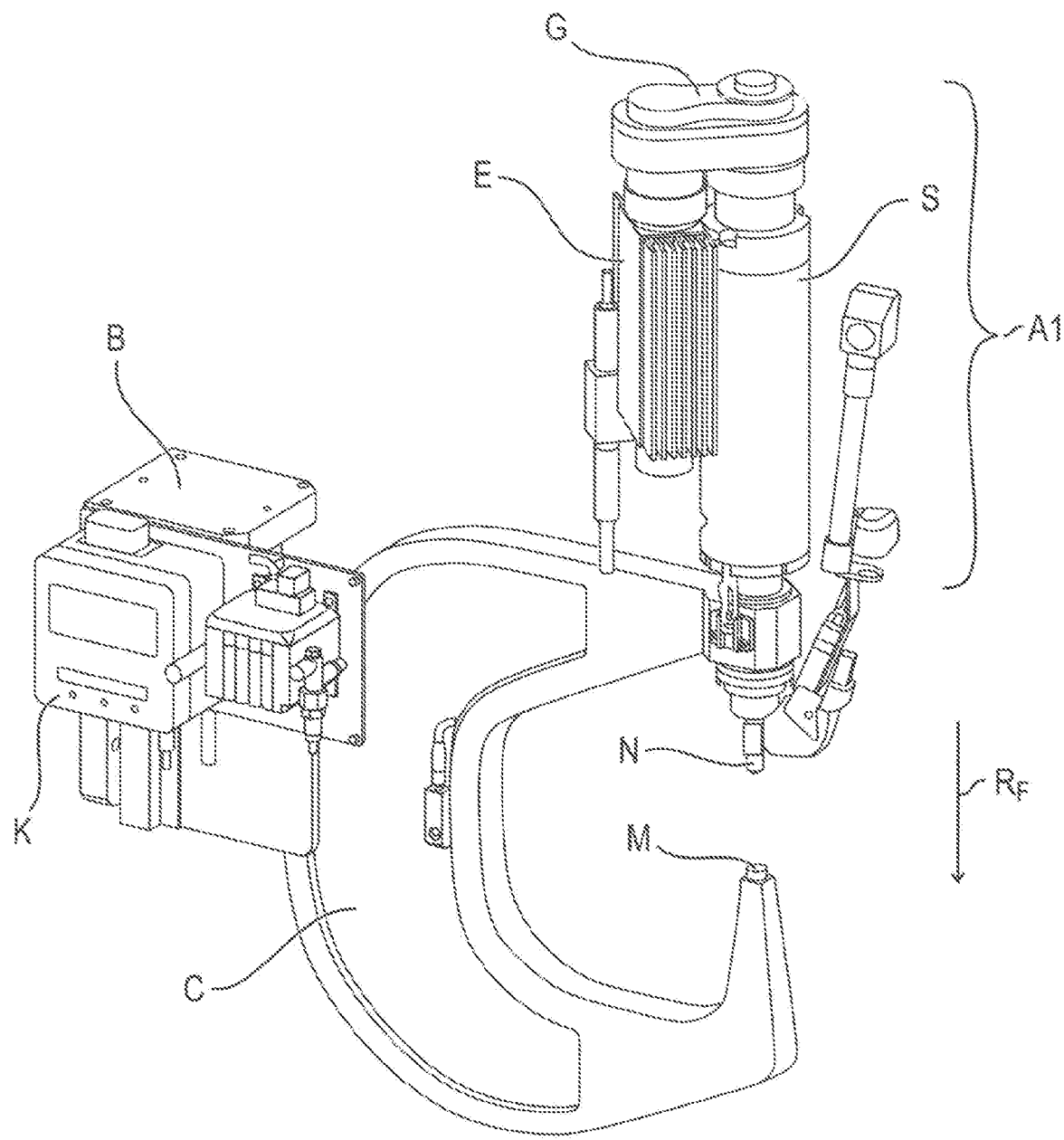

(51) Int. Cl.
*B21J 15/02* (2006.01)
*B21J 15/20* (2006.01)
*B21J 15/10* (2006.01)
*F15B 11/02* (2006.01)
*B21D 39/03* (2006.01)
*F16B 19/08* (2006.01)

(52) U.S. Cl.
CPC ............... *B21J 15/20* (2013.01); *B21J 15/26* (2013.01); *B21J 15/285* (2013.01); *F15B 11/022* (2013.01); *F16B 19/086* (2013.01)

(58) Field of Classification Search
CPC .... B21D 39/031; F16B 19/086; F15B 11/022; F15B 11/024; F15B 11/08; F15B 21/02
See application file for complete search history.

(56) References Cited

U.S. PATENT DOCUMENTS

| | | | |
|---|---|---|---|
| 6,742,235 | B2 | 6/2004 | Blacket et al. |
| 7,409,760 | B2 | 8/2008 | Mauer et al. |
| 9,149,862 | B2 | 10/2015 | Draht |
| 9,149,863 | B2 | 10/2015 | Draht et al. |
| 10,328,478 | B2 | 6/2019 | Erlenmaier et al. |
| 2007/0286740 | A1 | 12/2007 | Dehlke et al. |

FOREIGN PATENT DOCUMENTS

| | | |
|---|---|---|
| CN | 102686328 A | 9/2012 |
| CN | 104148572 A | 11/2014 |
| CN | 204867281 U | 12/2015 |
| CN | 105618658 A | 6/2016 |
| CN | 106536081 A | 3/2017 |
| DE | 20106207 U1 | 6/2001 |
| DE | 69920282 T2 | 9/2005 |
| DE | 102011002058 A1 | 10/2012 |
| DE | 112005002804 B4 | 7/2014 |
| DE | 102014200962 A1 | 7/2015 |
| EP | 0288719 A2 | 11/1988 |
| EP | 0439433 A1 | 7/1991 |

OTHER PUBLICATIONS

CN Office Action for CN Application No. 201810254252.5 dated May 17, 2019 (9 pages).

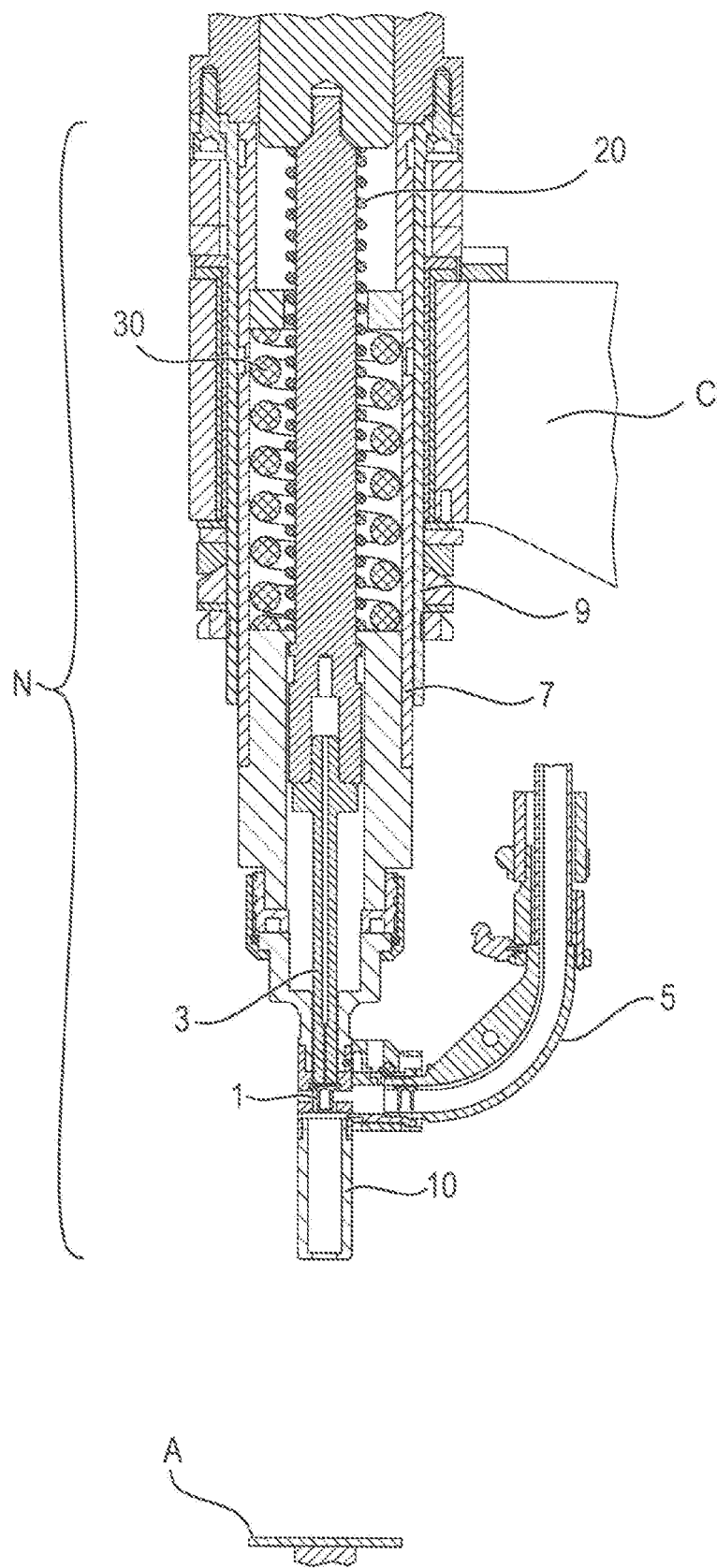

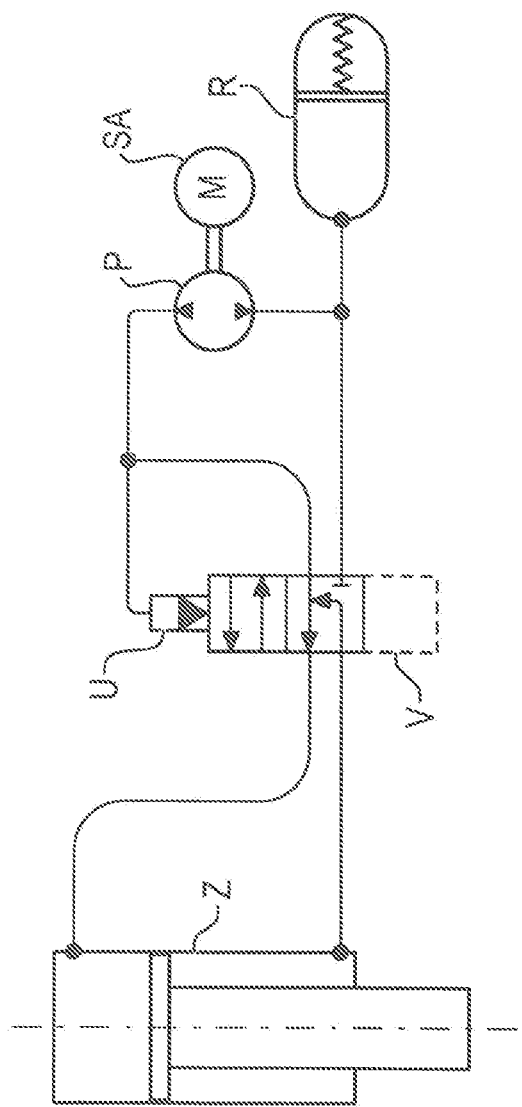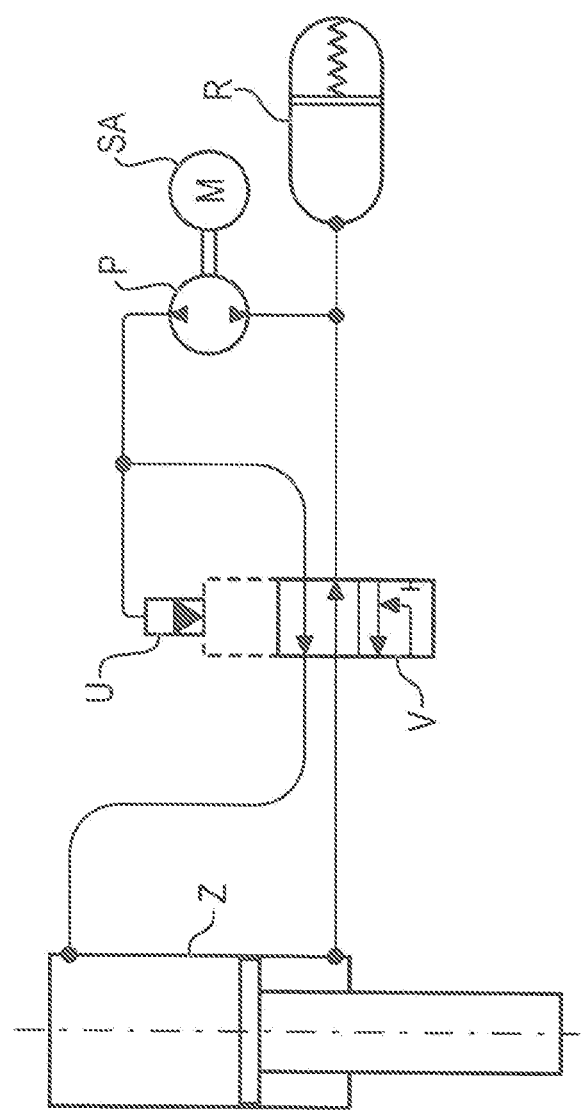
FIG. 10A
FIG. 10B

MULTI-STEP JOINING DEVICE AND JOINING METHOD THEREFOR

1. CROSS REFERENCE TO RELATED APPLICATIONS

This application claims priority to German Patent Application No.: DE 102017106449.4 filed Mar. 24, 2017. The content of this priority application is incorporated herein by reference in its entirety.

2. TECHNICAL FIELD

The present disclosure relates to a joining device, in particular a self-piercing rivet tool, a clinching device or a bolt-firing tool that comprises a drive unit, which operates in at least two steps, in the form of a single operating module. Moreover, the present disclosure relates to a joining method provided for the described joining device.

3. BACKGROUND

In practice, hydraulically-driven tools such as joining tools are widespread. They consist for example of a setting punch that is driven by a hydraulic cylinder and is connected with the assistance of hoses to a remotely located hydraulic source. In addition to the required space for the hydraulic source, the long hydraulic hoses are responsible for poor efficiency, undesirable interruptions or impairments during the process.

To avoid the involved equipment in terms of hydraulic hoses and the hydraulic source, increasingly, operating modules are desired that form a single operating unit. These single operating modules are driven electrically or electro-hydraulically as for example described in DE 10 2014 200 962 A1 and in DE 11 2005 002 804 B4.

DE 10 2014 200 962 A1 uses two coaxially-arranged spindles that are offset in a straight line with the assistance of an electric motor. A differential gear unit transmits the movement of the electric motor specifically to one or the other spindle. The differential gear unit converts the movement of the electric motor such that the first spindle, and accordingly the punch, are moved in a movement step quickly and with minimal force to the joining site. The punch is moved in a power step by the second spindle and the switched differential gear unit. This means that greater force can be applied by the punch than in the movement step. To accomplish this, the punch can only travel a shorter path per unit time than in the movement step. It is also disclosed to move the two spindles alternatively with different drives.

The single operating hydraulic unit of DE 11 2005 002 804 B4 combines two hydraulic pumps, a hydraulic reservoir, and a valve block. Depending on the respective application, these generate a low-pressure or high-pressure partial flow of the hydraulic fluid for operating a connected hydraulic cylinder of a blind rivet setting tool. The low-pressure partial flow provides a high volumetric flow with low power capacity so that the punch can be quickly moved over long punch paths. The high-pressure partial flow provides a low volumetric flow with high power capacity so that, in comparison to the low-pressure partial flow, high punch forces can be realized over short punch paths.

The single operating drive units that work in multiple steps cannot be operated efficiently with the existing equipment. A disadvantage is revealed especially when switching between the movement step, for example the step with the hydraulic low-pressure partial flow and the power step, such as the step with the hydraulic high-pressure partial flow. Since the switchover point is not precisely defined, both early and late switching from the movement step to the power step causes an uneconomical delay in the joining process. If the switching is too early, a punch path that is still pending is only traveled with a low punch speed. This delays the joining process. If the switch to the power step is too late, the punch attempts to join the components without being able to apply the required force. This also leads to an undesirable delay in the joining process.

An object of at least some embodiments of the present invention is therefore to provide a joining device and a joining method by means of which the known joining processes can be controlled and hence performed more effectively.

4. SUMMARY

The above object is achieved with a joining device in accordance with independent claim 1 and a joining method in accordance with independent claim 10. Advantageous embodiments and developments are found in the dependent claims, the description and accompanying drawings.

The joining device, in particular a self-piercing rivet tool, a clinching device or a bolt-firing tool comprises a punch with which a linear, nonrotating setting movement can be executed, a clamping device with which one or more components can be compressed in a joining direction, and a drive unit that operates in at least two steps with which the punch and the clamping device can be moved, and that can be switched over depending on a force that can be applied by the punch and/or clamping device, and/or depending on a realizable punch path and/or clamping device path, and/or depending on a joining time and/or an electrical motor current of the pump. The drive unit that operates in at least two steps has the following alternative configurations:

a. an at least two-step electrical spindle drive in which a gear unit converts a rotary movement of an electric motor into a linear setting movement of the punch by means of at least two switchable different transmission steps, or two or more spindles with different thread pitch, wherein the respective linear setting movement of the transmission steps differs in terms of possible setting paths per unit time, and/or in terms of an applicable punch force, and at least the electric motor, the switchable gear unit and the spindle drive form a single operating module, b. an at least two-step hydraulic punch drive with a dual-acting cylinder having a one-sided piston rod, a hydraulic reservoir, an electric motor connected to a first and second hydraulic pump step and a valve block which together form a single operating module, in the first step of which a high volumetric flow with a low hydraulic pressure in comparison to the second step can be provided, and in a second step of which a low volumetric flow with high hydraulic pressure can be provided, or c. an at least two-step hydraulic punch drive with a dual-acting cylinder having a one-sided piston rod, a hydraulic reservoir, an electric motor connected to a hydraulic pump and a valve block which together form a single operating module, the dual-acting cylinder being operable as a differential cylinder by means of its valve block so that, in its first step, a high volumetric flow with a low hydraulic pressure in comparison to the second step can be provided, and in its second step, a lower volumetric flow with high hydraulic pressure can be provided.

The joining device moreover comprises at least one load sensor so that a mechanical load on the punch and the clamping device in the joining direction can be detected, in particular a force sensor or a pressure sensor for hydraulic fluid, or a motor current sensor for the electric motor current of the pump, or a pressure sensor for compressed air, or a motor current sensor for the motor of the pump, and a path transducer by means of which a punch path and/or a clamping device path can be detected, and/or a time recorder so that a joining time can be detected and evaluated. In the joining device, the clamping device can be moved by the punch so that a mechanical load on the clamping device or the components can be detected by the load sensor. The clamping device can be clamped against the at least one component via at least one first spring by means of the punch movement, wherein reaching at least one first threshold value of the load on the punch and/or the clamping device is discernible by means of at least one control unit by itself or in combination with the load sensor, or reaching at least one first threshold value of the punch path is discernible by means of at least one control unit by itself or in combination with the path transducer, or reaching at least one first threshold value of the joining time is discernible by means of at least one control unit by itself or in combination with the time recorder, after which the drive unit that operates in at least two steps can be switched by the control unit between drive steps that comprises at least one movement step and the at least one power step, wherein the movement step is distinguished by a faster punch speed in comparison to the power step, and the power step is distinguished by a greater applicable punch force in comparison to the movement step.

To economically operate the joining device, the load on the punch is detected and evaluated depending on the traveled punch path, and/or depending on the passing time during the joining process. It is also preferred to detect an electric motor current of the servomotor with a current sensor that drives the pump of the drive unit. The strength of the motor current represents the load on the punch and the clamping device. The quality of the produced joint is evaluated based on these data. Moreover, adaptations are performed while operating the joining device in order to modify the joining process. In this regard, the joining process starts at the moment at which the punch is advanced toward the components to be joined. Correspondingly, the joining time is also measured at the start of advancement. Consequently, the phase of actually pressing a joining element into the components only assumes a fraction of the overall determined joining time. Since the punch preferably entrains the clamping device during its movement, the detected load on the punch also includes the load on the clamping device. Depending on the selected joining device configuration, the load on the punch is qualified by a punch force, a hydraulic pressure in the hydraulic cylinder driving the punch, or by a pneumatic pressure in a pneumatic cylinder driving the punch.

Since, according to a preferred embodiment, the joining process of the joining device is monitored and evaluated preferably permanently or temporarily in terms of the variables of load, punch path and/or time, at least one first threshold value or limit value of the load on the punch and/or the clamping device can be defined and discerned with reference to a load/punch path curve or a load/time curve, at which value a switchover between the possible steps of the drive unit must occur. Correspondingly, a central control unit is preferably provided that works in combination with one of, or a selection of, the available sensors of the joining device. In this regard, the central control unit receives the signals and data from the sensors, evaluates the data and transmits associated electrical control signals to the joining device. To realize this functionality, the central control unit is configured so that a predefined threshold value, or respectively a limit value of the load on the punch is associated with a stage in the joining process to be realized at which the punch necessarily realizes sufficiently high punch forces with the assistance of the working step, instead of high travel speeds in the movement step. Depending on the joining task to be achieved, such threshold values can be specifically defined and retrievably saved within the control unit. That which was stated about the definition and use of threshold values with regard to the load on the joining device likewise corresponds to the definition and use of threshold values for the punch path and joining time. Accordingly, the control unit evaluates the received control data, for example in a load/punch path curve, or in a load/joining time curve. Once it has been discerned that the limit values have been exceeded, a corresponding electrical signal of the control unit switches the drive unit between different drive steps.

In the same manner, it is alternatively preferable to equip and operate the joining device with at least one mechanically integrated control unit, and/or one electrically integrated control unit. Correspondingly, the threshold values are set in an unchangeable, purely mechanical or electronic manner in this at least one control unit by a mechanical design or electronic circuit. With reference to a hydraulically-operated drive unit, the control unit is operated by a hydraulically-operated changeover switch or switching valve with a purely mechanical design. The changeover switch or switching valve contains a spring-loaded tappet that is spring-loaded against the hydraulic pressure of the hydraulic cylinder of the drive unit. The spring bias preferably defines a pressure threshold value, i.e., a threshold value of the load. When the spring bias is graduated, this preferably establishes a plurality of pressure threshold values.

If the force exerted by the hydraulic pressure on the tappet exceeds the opposing force of the spring bias, the tappet changes to a different switching position. This switches the drive unit to a different drive step. The changeover switch or switching valve is switched between hydraulic pumps, or a differential switching system (see below) is activated or deactivated, or different performance steps of a hydraulic pump can also be specifically activated.

In an electronic drive unit, a switchover between gear steps or different spindles is preferably realized depending on the punch force or punch path. With regard to the punch path, preferably specific punch path positions can be defined and recognized by mechanical or electrical marks, for example by touch-sensitive switches, Hall sensors or magnetic switches. Selected marks then trigger a switchover between drive steps of the drive unit depending on the traveled punch path. One can proceed analogously with regard to the joining time. Accordingly the load/punch path data or joining data do not have to be detected and evaluated since the switchover is definitely preconfigured.

Nonetheless, it is preferable to provide an additional central control unit for monitoring and evaluating joining data received by sensors. This additional control unit then preferably serves to ensure the joining quality.

In the above configuration, the load-dependent, and/or punch-path-dependent, and/or joining-time-dependent threshold values that can also be termed switchover points are preset.

Likewise, a path transducer independently switches between the movement step and power step when a specific punch path and/or clamping device path is exceeded or undershot. With this type of switchover, preferably a length of a joining element to be processed such as a self-piercing rivet is taken into account, and the mode of the joining device is coordinated therewith. With regard to the detected joining time, temporal switchover points can also be specifically defined.

Therefore additionally or alternatively, at least one first threshold value of the punch path can be saved in the control unit and can be used from there for the purpose of evaluating a joining process analogous to at least one first threshold value of the load on the punch. Like a saved first threshold value of the punch path or the joining time, a saved first threshold value of the load accordingly ensures a timely and effective switchover from the movement step of the drive unit to the power step of the drive unit. It is also preferable to use the first threshold value of the load in combination with the first threshold value of the punch path. If these threshold values are not evaluated by a central control unit by themselves or in combination, they can be integrated as specifically-defined switching units in the joining device (see above).

The clamping device that is used in combination with the aforementioned different configurations of the drive unit comprises at least one spring for pretensioning the clamping device against the components to be connected. Since preferably the spring constant of the used clamping device spring is known, there is a characteristic progression of the load/punch path curve, or the load/time curve during the joining process realized by the joining device. Since preferably this detected curve, or respectively these detected data can be evaluated by the central control unit of the joining device, characteristic threshold values in the detected curves are discernible by the control unit and can be used to switch between the at least one movement step and the at least one working step of the joining device. To accomplish this, electrical control signals for switching over are then transmitted to the drive unit.

Correspondingly, it is preferred that an increased load with a constant rise is discernible with the assistance of the central control unit in the joining device, over the course of which the first threshold value of the load is defined. This constant rise in the increased load is specifically caused by the at least one first spring of the clamping device. By means of the constant rise, it is moreover discernible, preferably by the also detected punch path when, i.e., preferably as of which load or respectively punch force, as of which punch path and/or as of which joining time, a connection is established in the components, and preferably when it is finished. Consequently, it is also preferable to use another spring with a different spring constant than that of the first spring in addition to the first spring of the clamping device so that the actual start of the process of connecting the components is more precisely identifiable as a phase of the joining process.

As already mentioned above, the increased load can be evaluated by the central control unit of the joining device depending on the punch path or joining time. In this regard, the load is detected as a punch force, as a hydraulic pressure, as a motor current of the pump, or as a pneumatic pressure, and is forwarded to the control unit.

According to another embodiment of the joining device, a change in a first positive constant rise in the increased load to a second positive rise is detectable by the control unit, wherein the first rise is smaller than the second rise. Based on the increased rise, the drive unit can be specifically switched from the at least one movement step to the at least one power step. Whereas the first positive constant rise in the increased load preferably characterizes the effect of the spring of the clamping device, a change in the rise, and accordingly a second rise, indicates that the clamping device has pretensioned the components with the assistance of a second spring, or that the connecting process has started, for example by driving in a self-piercing rivet into the components. Both stages of the joining process are characterized by a second rise in the load/punch path curve, and/or the load/joining time curve, by a rise that is greater than the first rise within this curve. Providing that these switchover points are automatically discernible by the control unit, the control unit, with the assistance of electronic switching signals during the joining process, realizes an associated efficient switchover for example from the movement step to the power step of the drive unit of the joining device, or from a first movement step to a second movement step.

According to another embodiment, the clamping device of the joining device comprises a second spring by means of which the punch can be pretensioned relative to the components, and that has a greater spring constant than that of the first spring. Correspondingly, the above-discussed contour results in the detected load/punch path curve or the load/time curve evaluated by the control unit. Moreover, it is also preferable for a mechanically integrated, or respectively preconfigured control unit to independently recognize the increased load from the second spring and correspondingly switch the drive unit during the joining process.

Furthermore, the joining device comprises the above-discussed independently switching and mechanically or electronically integrated control unit. This independently-switching control unit switches between the drive steps of the drive unit based on a mechanical or electrical configuration depending on the load, preferably depending on the pressure, or depending on the path. Given the mechanical or electrical preconfiguration of the independently-switching control unit, it is unnecessary for the control unit to transmit electrical control signals to the drive unit or other components of the joining device. Instead, the drive steps of the drive unit are switched directly in the mechanically preconfigured or electrically preconfigured control unit depending on changing joining parameters such as for example the load, or punch path, or joining time. With this alternative design of the joining device, a robust construction is provided, with the amount of servicing also being less than when using a central control unit (see above).

According to another embodiment, the joining device is provided as a self-piercing rivet tool. This self-piercing rivet tool has the at least two-step hydraulic punch drive as the drive unit. Moreover, this joining device comprises the above-described mechanically preset switching valve as the preconfigured control unit for switching the drive unit between the movement and power step. This switching valve, or respectively this type of control unit, switches from the movement step to the power step and vice versa depending on the pressure.

Moreover, the present disclosure relates to a joining method of a joining device, in particular a joining device according to one of the above-described embodiments, in which a punch executes a linear, nonrotating setting movement, a clamping device compresses one or more components in a joining direction, and a drive unit that operates in at least two steps can move the punch and the clamping device, and that is switched depending on a force that can be applied by the punch and/or clamping device, and/or depending on a realizable punch path, and/or depending on a joining time. The drive unit has the following features:

a. an at least two-step electrical spindle drive in which a gear unit converts a rotary movement of an electric motor into a linear setting movement of the punch by means of at least two switchable different transmission steps, or two spindles with different thread pitch, wherein the respective linear setting movement of the transmission steps differs in terms of possible setting paths per unit time, and/or in terms of an applicable punch force, and at least the electric motor, the switchable gear unit and the spindle drive form a single operating module, or b. an at least two-step hydraulic punch drive with a dual-acting cylinder having a one-sided piston rod, a hydraulic reservoir, an electric motor connected to a first and second hydraulic pump step and a valve block which together form a single operating module, in the first step of which a high volumetric flow with a low hydraulic pressure in comparison to the second step can be provided, and in a second step of which a low volumetric flow with high hydraulic pressure can be provided, or c. an at least two-step hydraulic punch drive with a dual-acting cylinder having a one-sided piston rod, a hydraulic reservoir, an electric motor connected to a hydraulic pump and a valve block which together form a single operating module, the dual-acting cylinder being operable as a differential cylinder by means of its valve block so that, in its first step, a high volumetric flow with a low hydraulic pressure in comparison to the second step can be provided, and in its second step, a lower volumetric flow with high hydraulic pressure can be provided, wherein at least one load sensor detects a mechanical load on the punch and/or the clamping device in the joining direction, in particular a force sensor or a pressure sensor for hydraulic fluid, or a pressure sensor for compressed air, and with a path transducer by means of which a punch path and/or a clamping device path is detected, and/or a time recorder by means of which a joining time is detected, wherein the clamping device is moved by the punch so that a mechanical load on the clamping device is detected by the load sensor, while the clamping device is pressed against the at least one component via at least one first spring by the movement of the punch, wherein reaching at least one first threshold value of the load on the punch and/or the clamping device is discernible by means of at least one control unit by itself or in combination with the load sensor. Alternatively, reaching at least one first threshold value of the punch path and/or the clamping device path is recognized by a control unit by itself or in combination with the path transducer. Also alternatively, reaching at least one first threshold value of the joining time is recognized by a control unit by itself or in combination with the time recorder. Then the drive unit that operates in at least two steps is correspondingly switched by the control unit between drive steps, in which the drive steps comprise at least one movement step and at least one power step in which the movement steps are distinguished by a faster punch speed in comparison to the power step, and the power step is distinguished by a greater applicable punch force in comparison to the movement step.

The above-described joining method is for being able to control a drive unit of a joining device that can switch between drive steps more efficiently. For this purpose, the preferred joining method uses the evaluation of load data during the joining process that are generated by the use of a clamping device pretensioned with at least one spring, as well as with a punch moved by the drive unit. Alternative to the load, it is preferable to control the joining process depending on the detected punch or clamping device path, or depending on an elapsed joining time. The change of the load signal or the change of the punch path or also the joining time provide information on when preferably the compression, or respectively setting processes of components to be connected to each other is/are concluded so that the actual connecting of the components follows. Since the effect of the punch in the movement step is sufficient for compressing, or respectively setting the components to be connected to each other, a switchover from the movement step to the working step of the drive unit does not yet have to occur in this phase of the joining process. The strong punch force in the working step and hence a prior switchover from the movement step to the working step within the drive unit is only necessary when the components are connected in the context of joining process, i.e., for example a self-piercing rivet is set, or the components are connected by clinching.

With the assistance of this coordinated switchover from the at least one movement step to the at least one working step of the drive unit coordinated with the actual stage of the joining process, preferably an effective transaction of the joining method is ensured. Unnecessary joining times arising for example from a premature power step are thereby avoidable.

According to a further embodiment, the control unit by itself or in combination with the load sensor detects an increased load with a constant rise, over the course of which the first threshold value of the load is defined. Alternatively, it is preferable to establish a first threshold value of the punch path, or first threshold value of the joining time in order to identify a status of the joining process. The aforementioned first threshold values are preferably used to recognize a compression of the components that occurs in preparation of the actual connecting process with the assistance of the clamping device, or respectively the corresponding setting processes of the components. It is moreover preferred to identify a beginning of the connecting process of the components by the threshold value of the punch path, or the threshold value of the joining time.

To this end, the control unit is provided as the central control unit according to an alternative. The joining parameters determined by the sensors are transmitted to this central control unit. These sensors include the load sensor, the punch path transducer, and/or the joining time from the time recorder. The resulting joining parameters are the load, i.e., the hydraulic pressure or punch force or pneumatic pressure, the punch path, and the joining time that are evaluated within the control unit. As a result of the evaluation, the change in the load depending on the punch path or the joining time is obtained. From this stream of data, threshold values saved in the central control unit can be ascertained, and the central control unit then correspondingly transmits an electronic control signal to the drive unit to switch between work steps.

Alternatively, it is also preferable to integrate at least one control unit that is preconfigured mechanically or electrically into the joining device as explained above in combination with the description of the joining device. In view of the load from a hydraulic cylinder, it is preferable to use a switching unit for the drive steps of the drive unit in conjunction with the hydraulics driving the punch as a preconfigured and automatically switching control unit. A spring-loaded tappet is provided within the switching unit which is exposed to the pressure of the hydraulic fluid for driving the punch. Once the force applied to the tappet by the hydraulic fluid, that preferably also moves the punch and clamping device, exceeds a spring bias in the opposite direction of the tappet, the switchable tappet is deflected so that a switchover occurs within the drive step of the drive unit. Neither the evaluation of sensor data, nor the transmission of electrical control signals by a central control unit, nor a mechanical transformation of electrical control signals in the switching unit is necessary for the switchover. An integrated, preconfigured control unit is therefore used that reduces switching effort for the drive steps of the drive unit.

According to another embodiment of the joining method, the control unit by itself or in combination with the load sensor detects the increased load over the course of which the first threshold value of the load is defined. With detection in the central control unit, the load is evaluated depending on the punch path or joining time. The central control unit receives and evaluates control data transmitted to it. Based on the evaluation, electronic control data are transmitted to the drive unit.

With the integrated and preconfigured control unit, a reaction to changing joining parameters such as load, or punch path, or joining time is mechanically or electrically preconfigured or integrated in the joining device. This is accomplished by switching the drive steps depending on the hydraulic pressure in the working cylinder without the hydraulic pressure being absolutely detected and evaluated. Instead, the active hydraulic pressure is used as a control medium to realize the switchover by a spring-loaded switching unit. Moreover, it is preferable to detect the load as a punch force, as a hydraulic pressure, or as a pneumatic pressure.

Depending on the configuration of the drive unit used, the load can be determined with the assistance of different variables. Independent of whether the punch is driven electromotively, hydraulically or pneumatically, the mechanical load can be described with the assistance of the punch force. If the punch is preferably driven by a hydraulic cylinder, then the hydraulic pressure measurable in the hydraulic cylinder is also usable, detectable and evaluable as a reference variable for the force or load acting on the punch. The same holds true when the punch is driven by a pneumatic cylinder.

According to another embodiment of the joining method, based on the obtained sensor data in the increased load, the control unit detects a change from a first positive constant rise to a second positive rise, wherein the first rise is smaller than the second rise. Based on the detected increased rise, the control unit switches the drive unit from the at least one movement step to the at least one power step. In this regard, preferably electrical switching signals are transmitted to the drive unit.

The data accompanying and describing a joining process such as the load and punch path and/or the joining time are detected with the assistance of the central control unit. If the first positive constant rise in the load/punch path or load/joining time curve rises more strongly, i.e., experiences a positive change in the rise, a switching point between the movement step and power step can be identified by means of this change in the rise. Such a switching point, or respectively such a change in the rise is for example indicated by the start of the actual component connecting process, preferably pressing a self-piercing rivet into the components. Moreover, it is preferable for the effect of another clamping device spring to be indicated by such an additional rise in the load curve. In summary, the descriptive change in the rise can however be used to initiate or prepare for a switchover between the movement step and power step. The same holds equally true for the movement of the punch in the joining direction and opposite the joining direction.

According to another embodiment of the joining method, the clamping device of the joining device has a second spring by means of which the clamping device can be pretensioned against the components, and that comprises a greater spring constant than that of the first spring. Correspondingly, this second spring of the clamping device ensures the above-discussed preferred increased rise in the load curve for the just-performed joining process. When this second spring with its greater spring constant preferably only has a relatively short or known compression path, the detected compression of the second clamping device spring is a detectable signal for switching the drive unit from the at least one movement step to the at least one power step. It is thus preferable to use one or more springs with a different or equivalent spring constant in combination with the clamping device in order to identify the position of the punch relative to the components to be connected to each other by means of the load curve for the respective joining process. Once the different spring constants of the used springs evaluably reveal in the context of the detected load curve that the connecting phase is pending within the context of the joining process, this is a suitable switching point from the at least one movement step to the at least one power step of the drive unit.

Therefore, in the context of at least some embodiments of a joining method according to the invention, the second positive rise detected by the control unit is indicative of the effect of the second spring of the clamping device, provided that the detected second positive rise is constant.

Accordingly, like the above-described joining device, the present joining method uses at least one independently-switching control unit, or a central control unit supplied with sensor data in order to specifically switch between drive steps of the drive unit. Preferably, a central control unit is used in addition to an independently, or respectively automatically switching control unit. In this case, the central control unit does not serve to switch the drive steps, but rather for quality control and differently configuring the joining process. The independently-switching control unit switches between the drive steps of the drive unit based on a mechanical configuration depending on the load, in particular depending on the pressure, or depending on the path. The preferred central control unit receives data from the connected sensors such as the load in the form of punch force, hydraulic pressure or pneumatic pressure, the punch path and/or the joining time. These data are evaluated and interpreted in the form of known joining curves such as for example a force/path curve, or a force/joining time curve. Corresponding switching processes for the drive unit are triggered by certain trajectory directions of these curves, or when previously-defined threshold values are exceeded. For this, the central control unit transmits corresponding electronic switching signals to the drive unit so that a movement step switches to the power step and vice versa.

According to another embodiment, the above-described at least two-step hydraulic punch drive is switched by a mechanically preset switching valve as the control unit. The switchover occurs when a hydraulic pressure in the hydraulic punch drive has reached a threshold value of the hydraulic working pressure. By using this method, the absolute detection and evaluation of the joining parameters is omitted. Within the joining device, a direct switchover occurs between the drive steps of the drive unit provided that mechanically defined or respectively preconfigured threshold values, or electrically defined or respectively preconfigured threshold values are reached.

5. BRIEF DESCRIPTION OF THE ACCOMPANYING DRAWINGS

Figure 2:
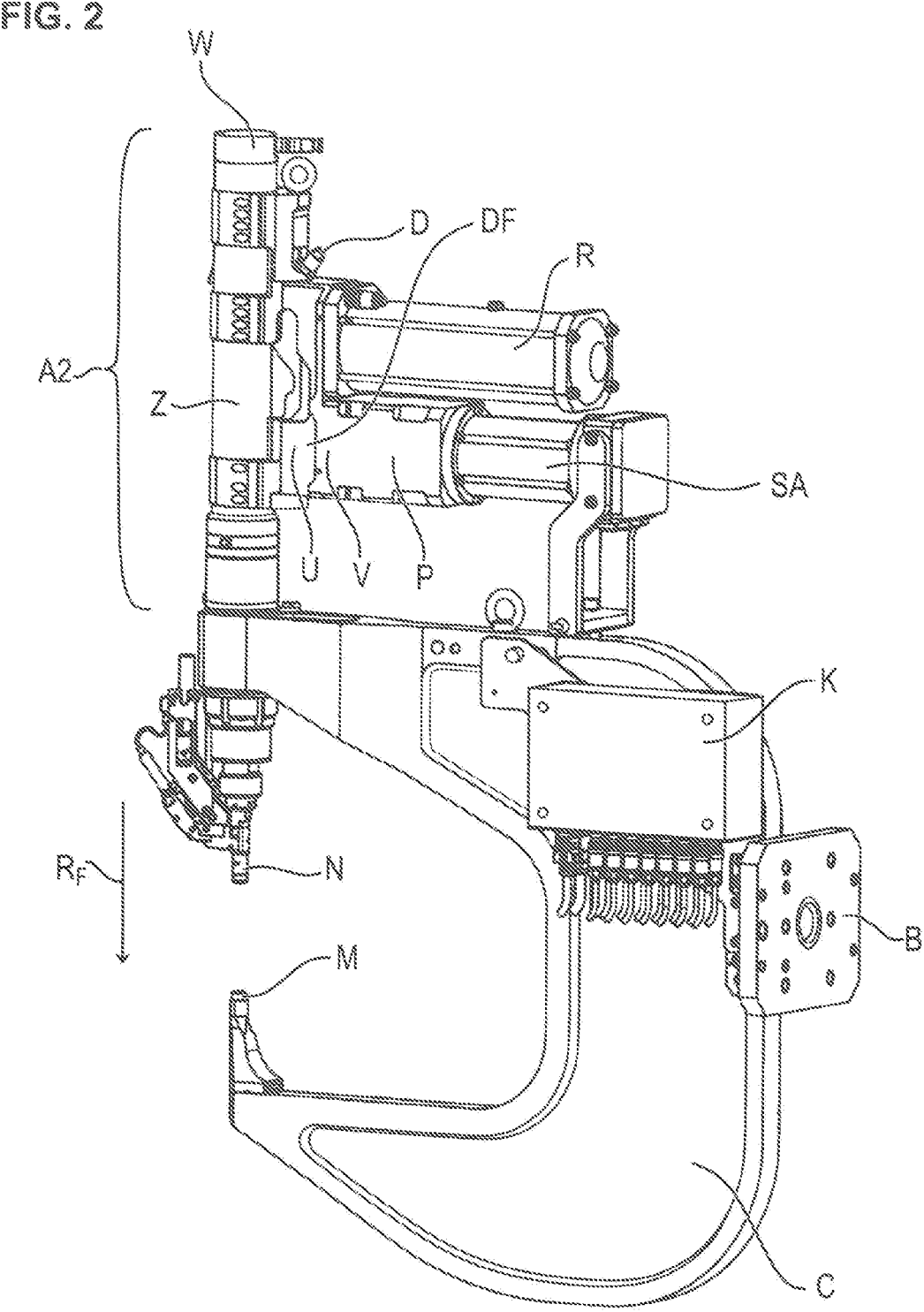
Figure 3:
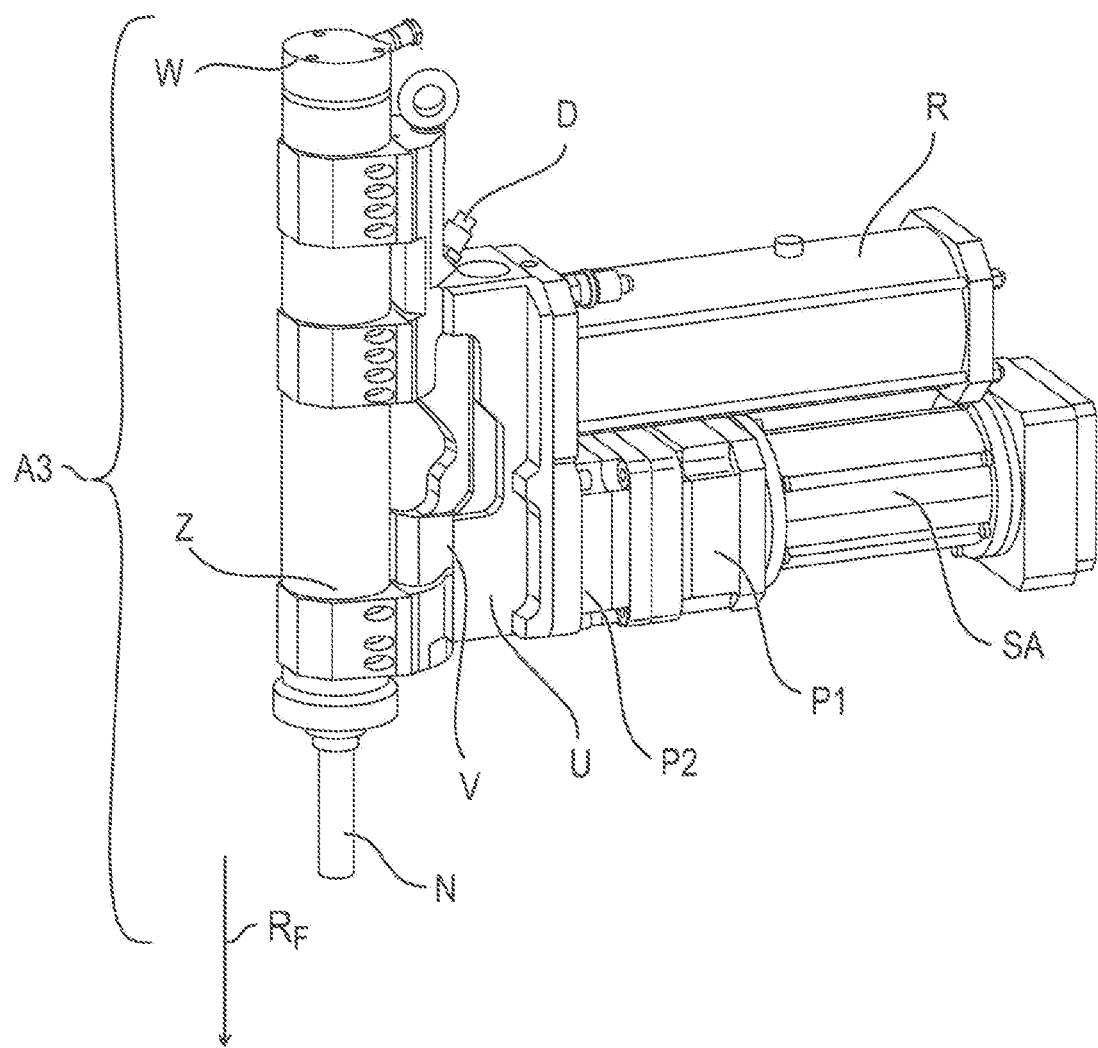
Figure 4:
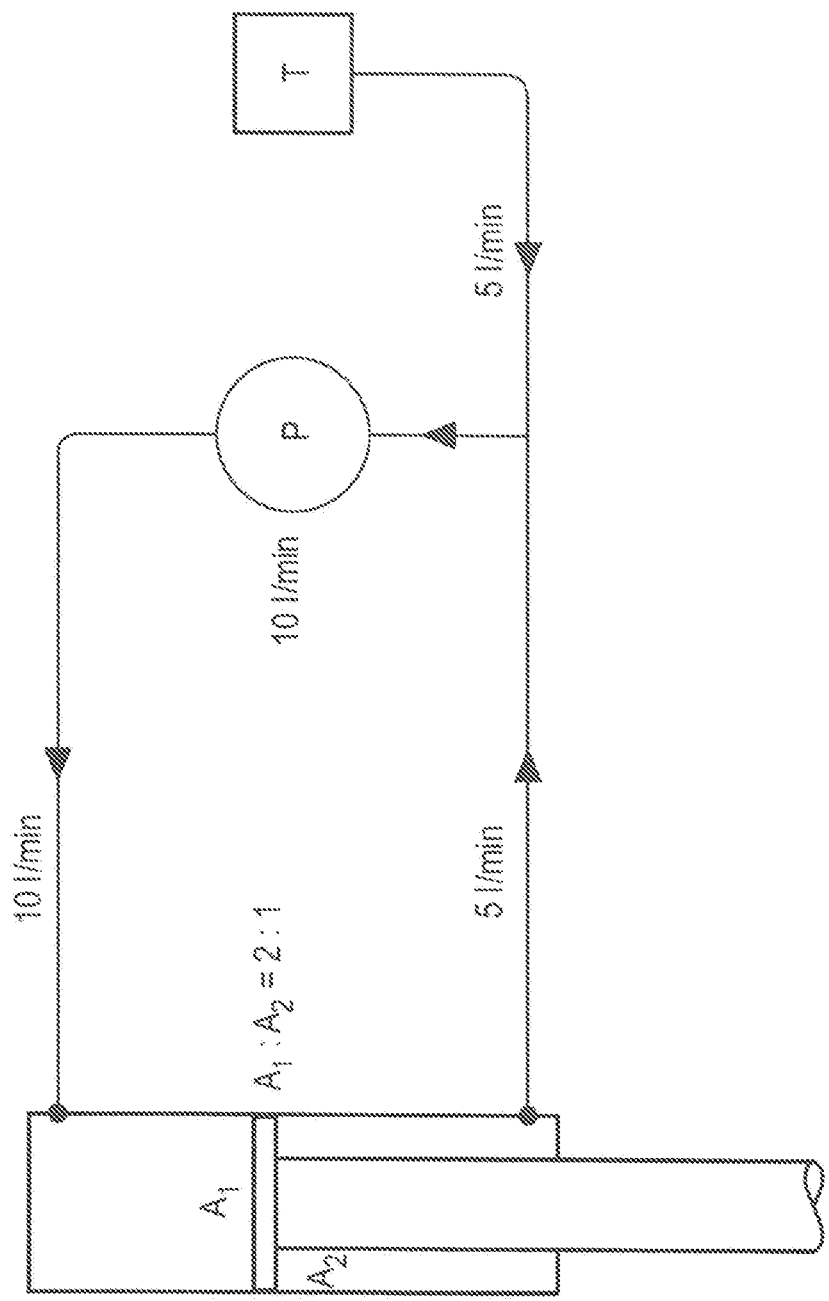
Figure 5:
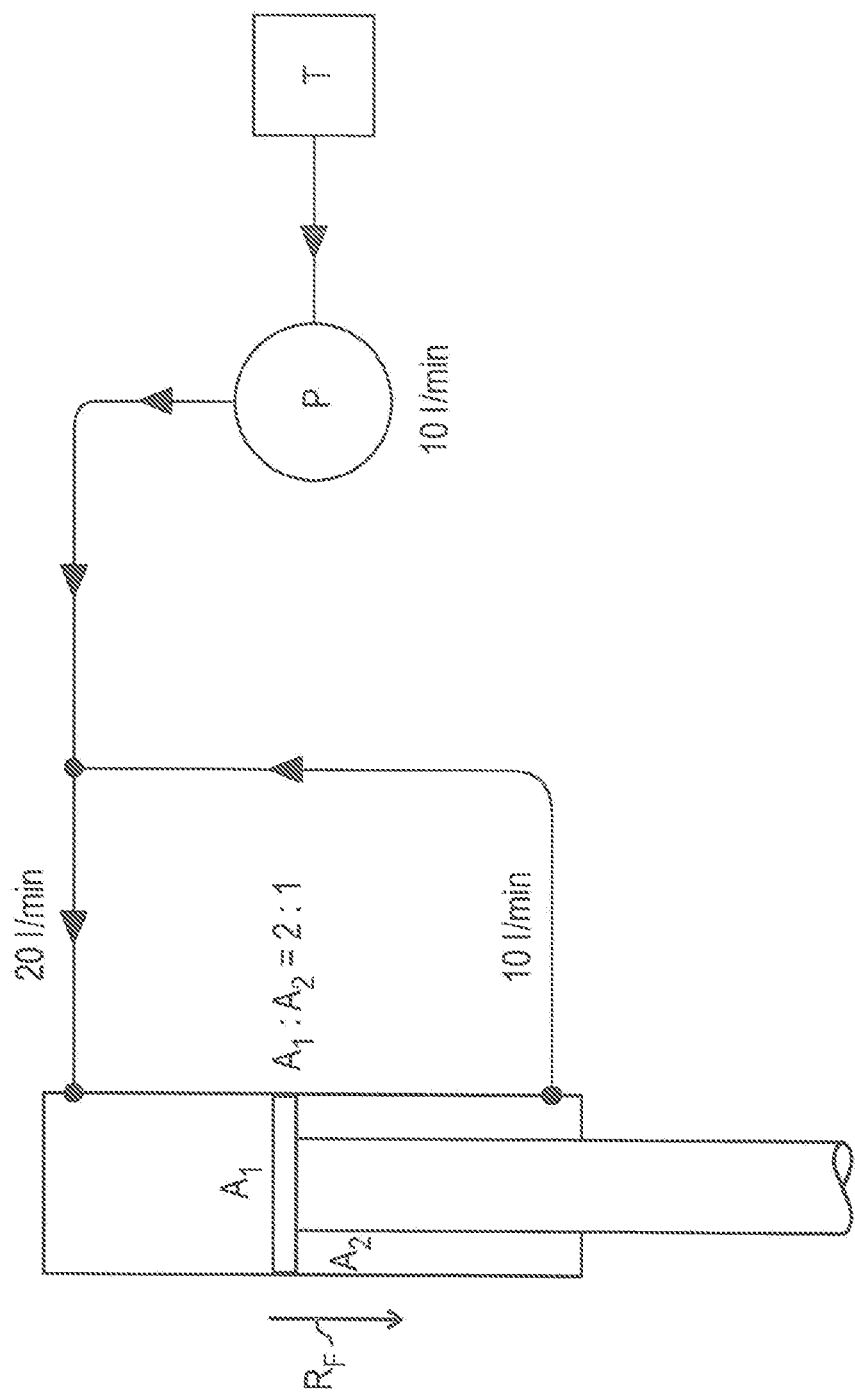
Figure 6:
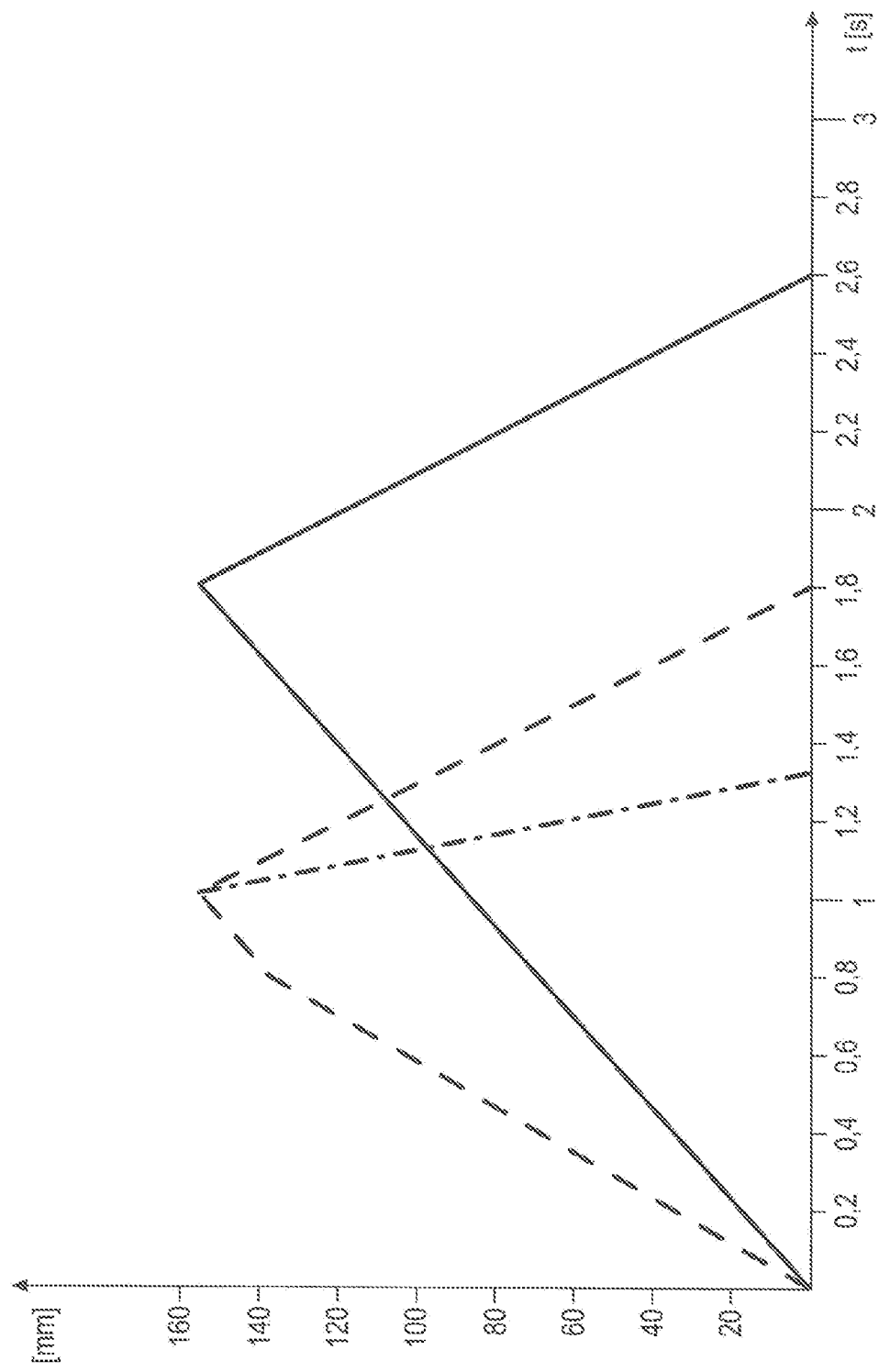
Figure 7B:
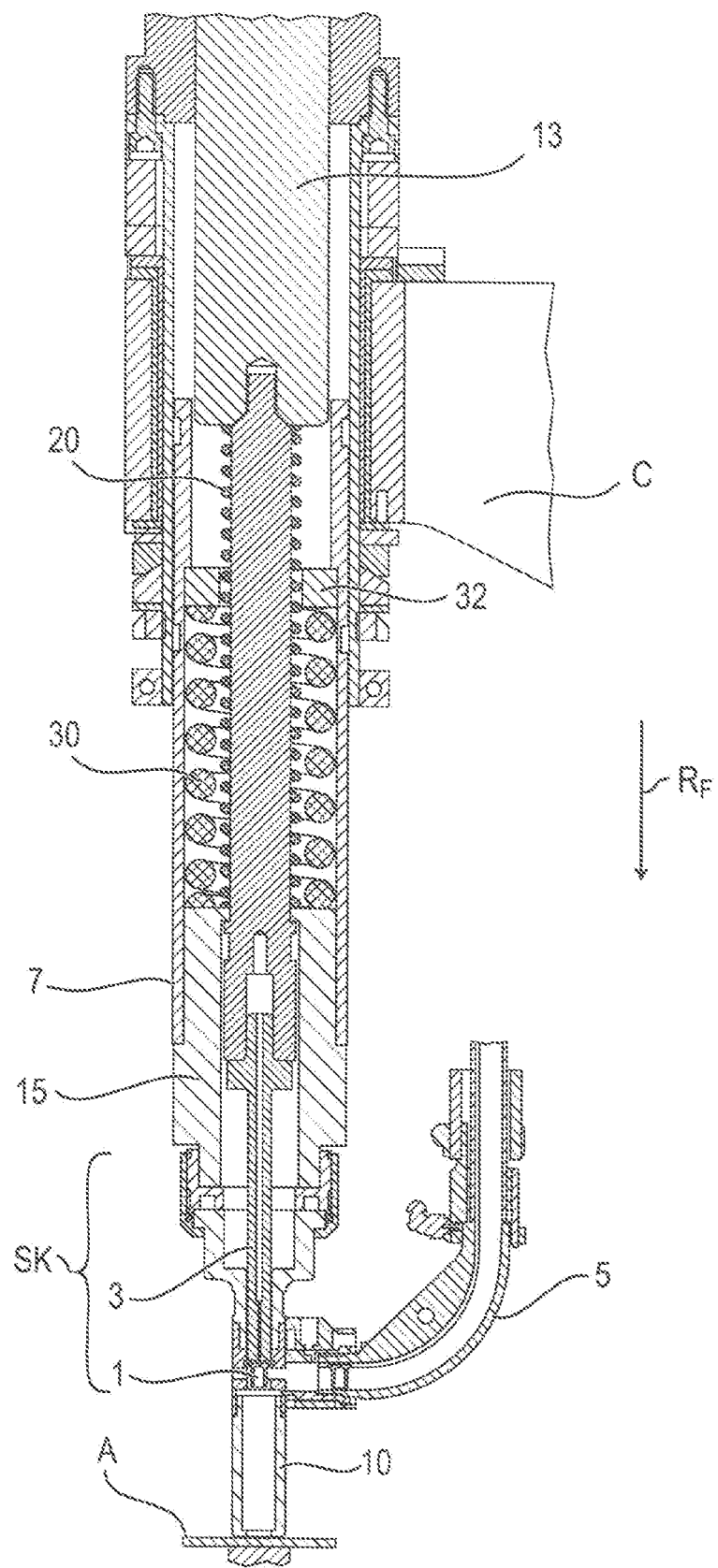
Figure 7C:
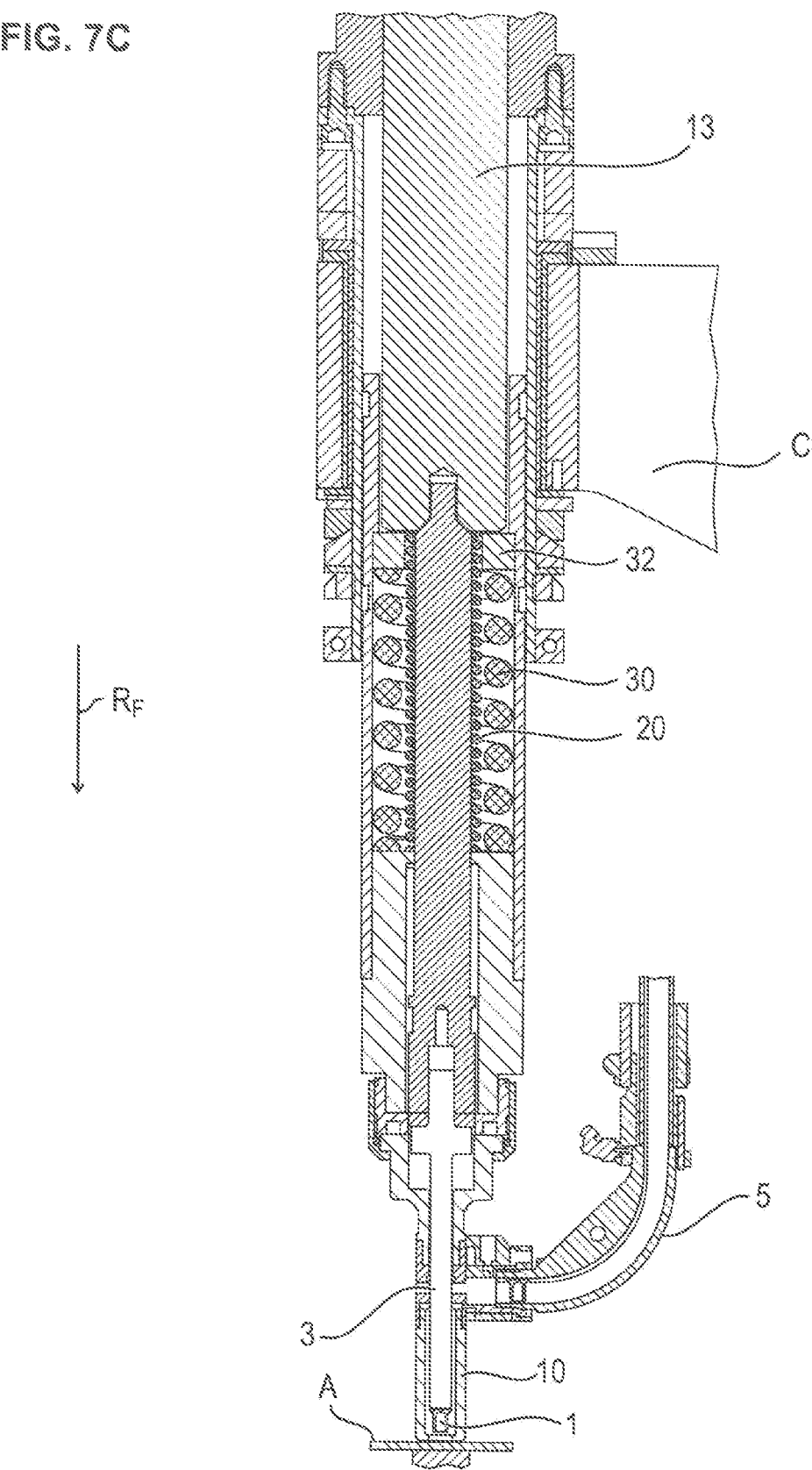
Figure 7D:
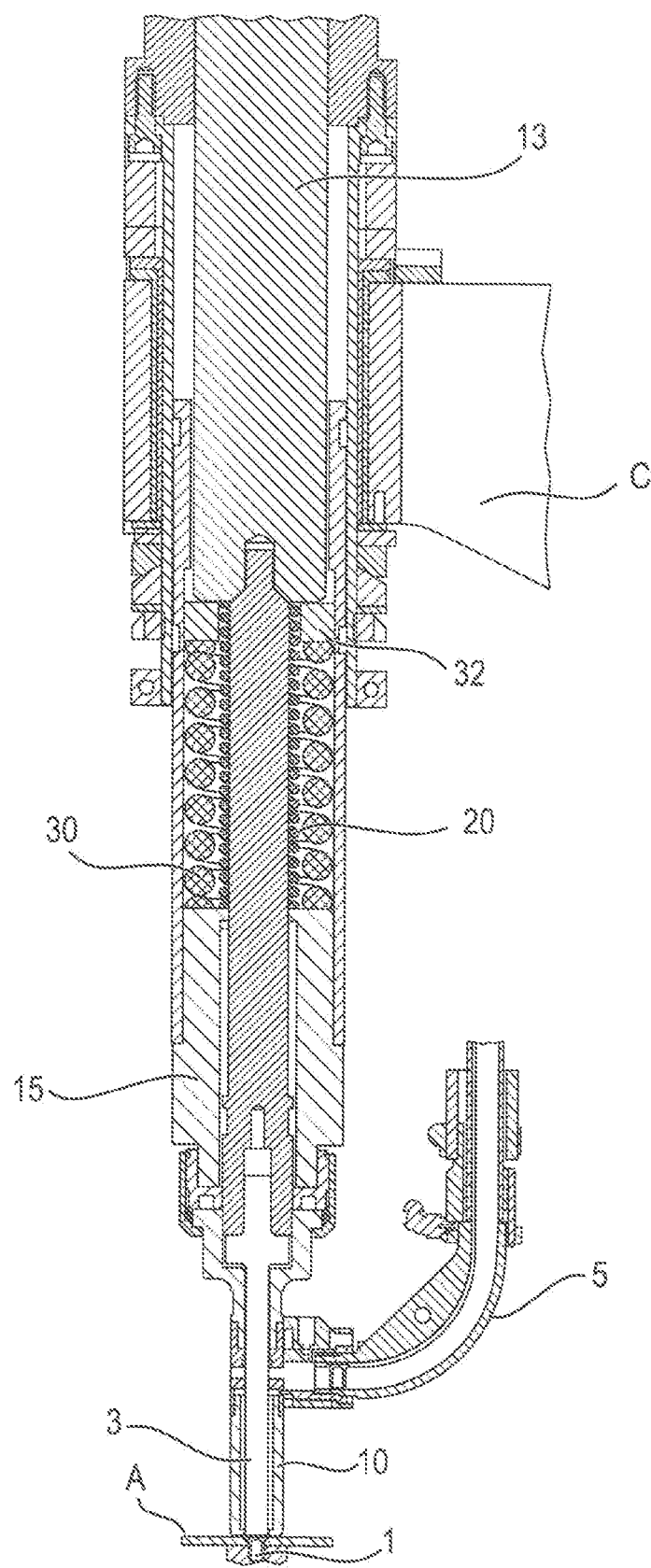
Figure 8:
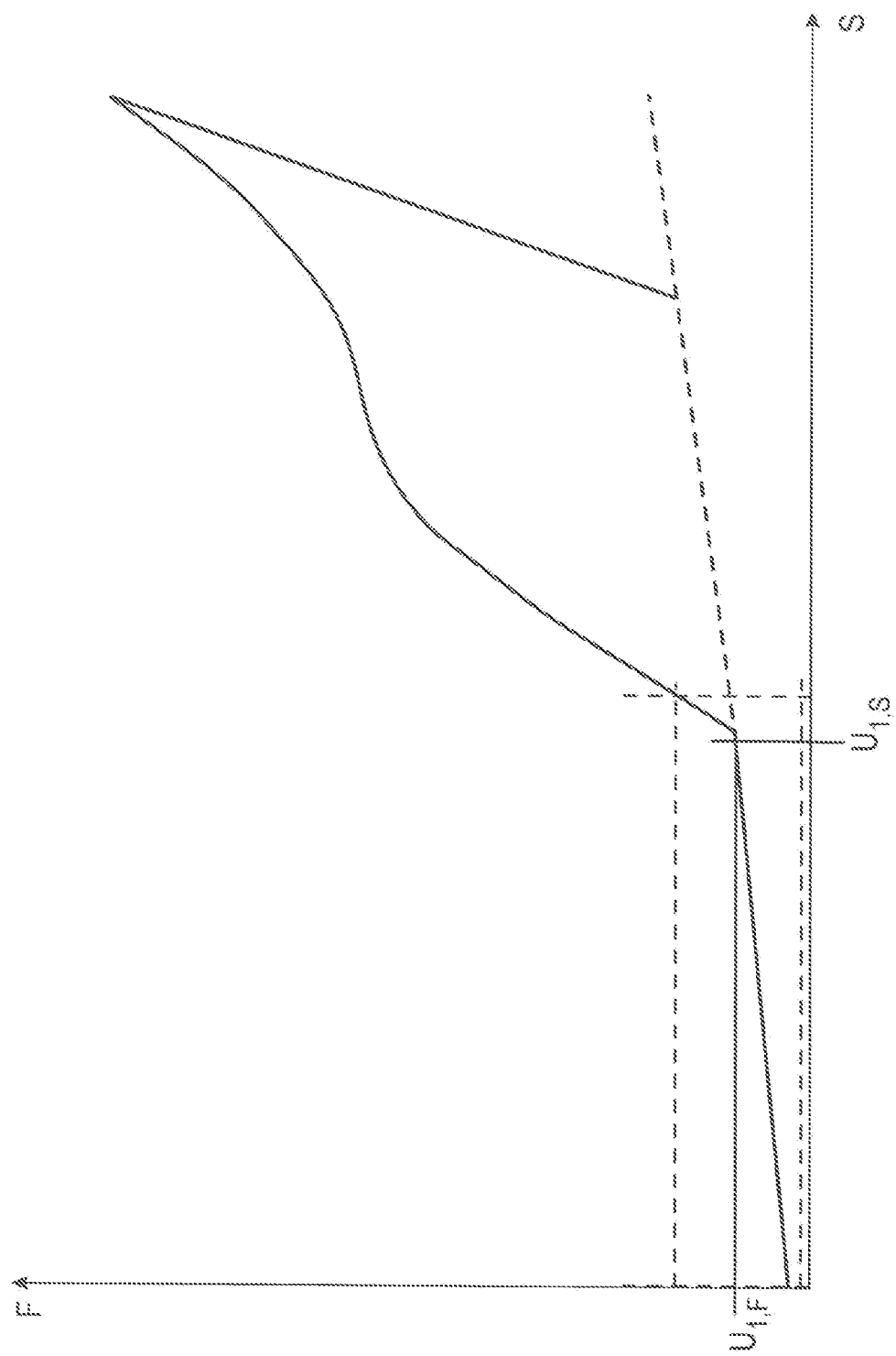
Figure 9:
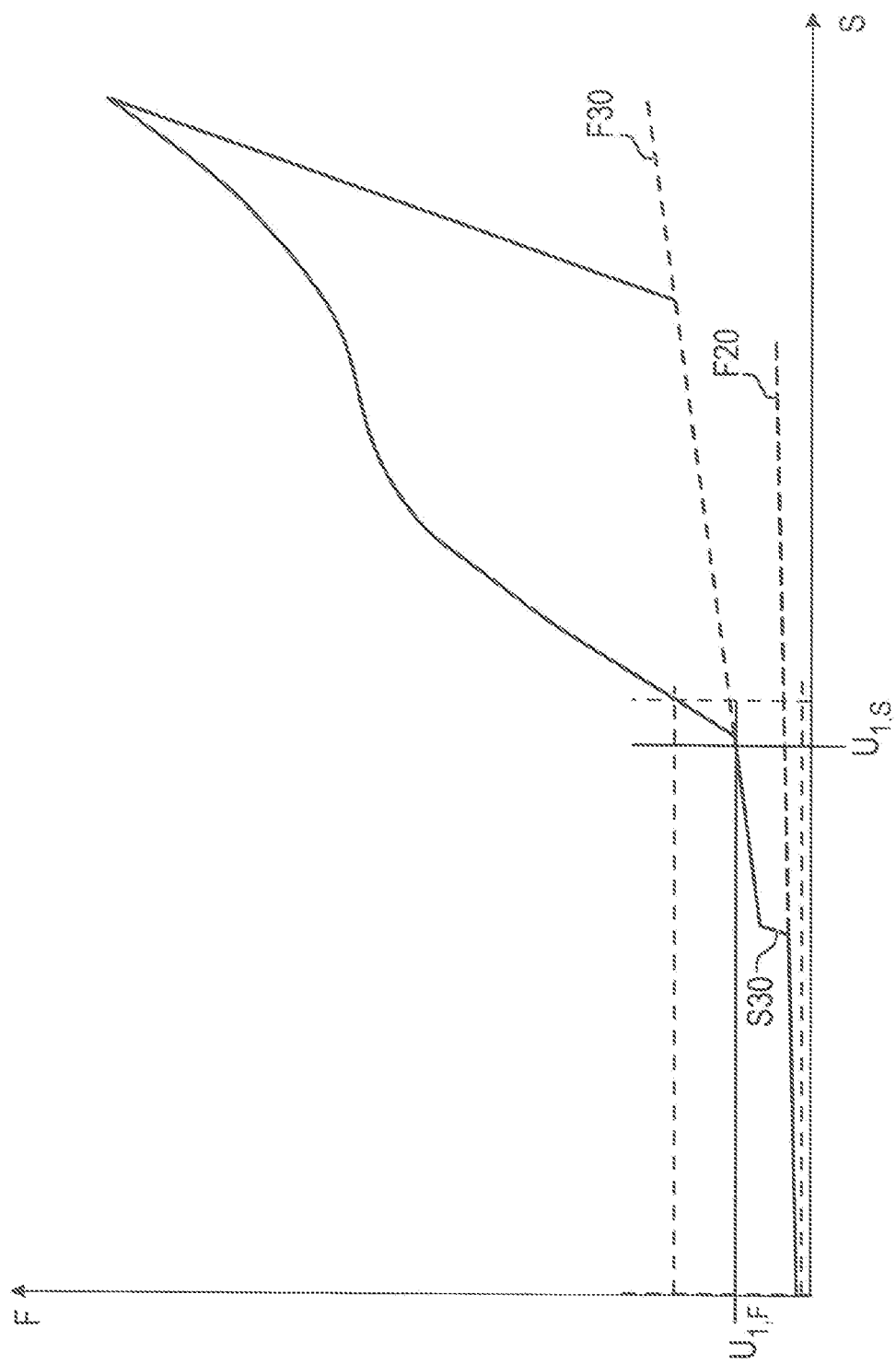
Figure 11:
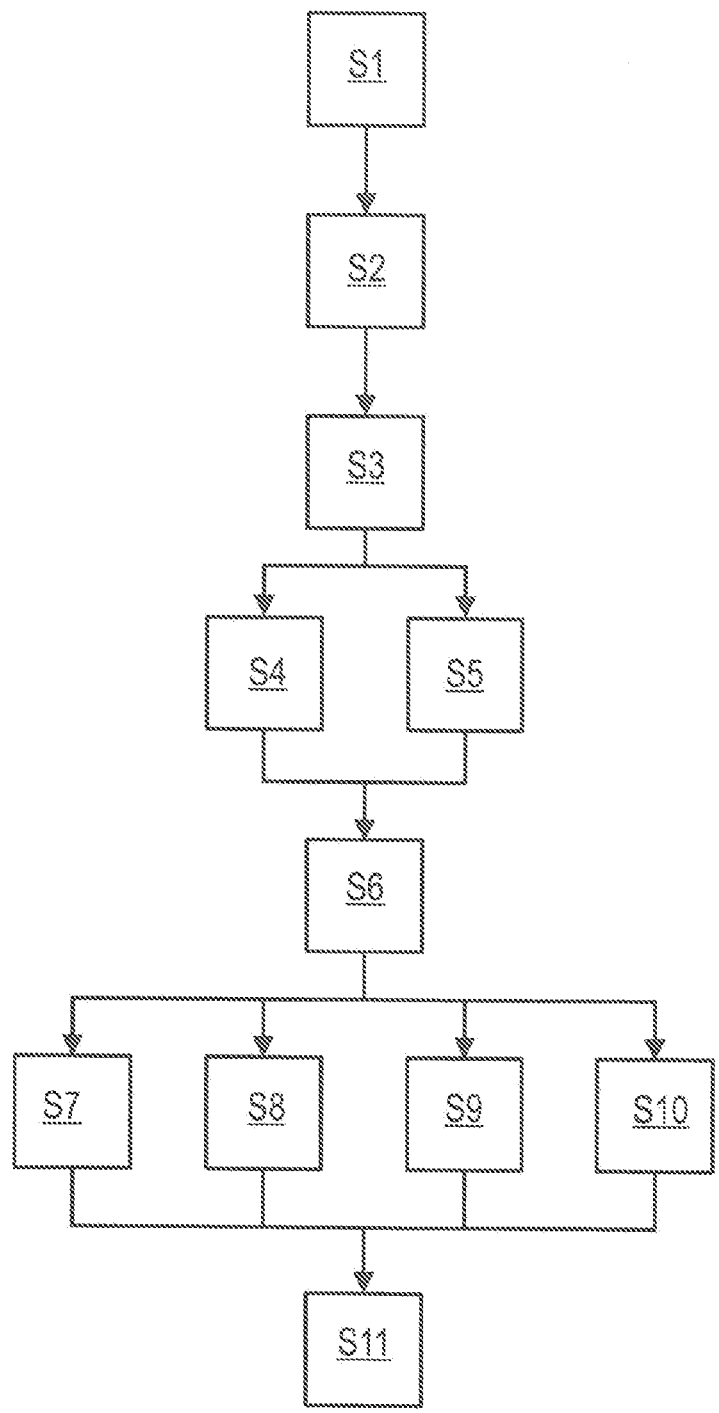

The present invention will be explained in greater detail with reference to the accompanying drawings. In the following:

FIG. 1 shows an embodiment of a joining device with a C-frame and a single operating electromechanical drive unit attached thereto, FIG. 2 shows an embodiment of a joining device with a C-frame and a single operating electrohydraulic drive unit attached thereto, with a hydraulic pump and a differential switching system of the hydraulic cylinder, FIG. 3 shows an embodiment of an electrohydraulic drive unit with at least two hydraulic pumps, FIG. 4 shows a prior art hydraulic circuit diagram, FIG. 5 shows an embodiment of a hydraulic circuit diagram that uses a differential switching system in combination with a dual-acting hydraulic cylinder and only one hydraulic pump, FIG. 6 shows a schematic representation of a punch path/joining time diagram in which the differences between a known hydraulic drive unit and the preferred hydraulic drive unit are illustrated, FIG. 7A-D shows different stages of a clamping device design during a joining process, in particular clarified with reference to a setting process for a self-piercing rivet, FIG. 8 shows a representation of a punch force/punch path diagram that illustrates the preferred switchover between drive steps of the drive unit depending on at least one defined threshold value, FIG. 9 shows an embodiment of a punch force/punch path diagram to illustrate a preferred switchover between working steps of the drive unit based on at least one defined threshold value, FIG. 10 A, B show an embodiment of a hydraulic circuit diagram that shows a differential switching system in combination with a dual-acting hydraulic cylinder and a switching unit in which FIG. 11 A portrays the movement step, and FIG. 11 B portrays the power step of the electrohydraulic drive unit, FIG. 11 shows a flow chart of an embodiment of the joining method.

6. DETAILED DESCRIPTION

The present disclosure relates to a joining device for producing a connection between at least two components A, or for introducing a joining or functional element 1 into at least one component A. Such a joining device is a setting tool for self-piercing rivets, a clenching device, a bolt-firing tool, etc. In the following, the joining device will be described with reference to a preferred example of a setting tool for self-piercing rivets since this embodiment can be analogously transferred to the other aforementioned joining devices.

Preferred embodiments of the setting tool are represented in FIGS. 1 to 2. The respective setting tool has a known C-frame C, on the opposing ends of which a die M and a drive unit A1; A2; A3 are arranged. The drive unit A1; A2; A3 is a single operating module that can be operated almost independently from its surroundings. In this context, "almost independently" means that only electrical lines and rivet supply hoses run to the drive unit, with a negligible possible disruption potential for the joining device. In comparison to known hydraulically-operated setting tools, this means that long hydraulic hoses for operating the drive unit A1; A2; A3 are unnecessary. Moreover, a remotely-arranged hydraulic source does not have to be provided for the drive unit A2; A3 since the drive units A2; A3 explained below have their own hydraulic reservoir R. Given the absence of hydraulic hoses from the remotely arranged hydraulic source, such a joining device has a reduced interfering contour. Moreover, it is more flexible and easier to handle, and is associated with a smaller space requirement in comparison to conventional hydraulically-operated setting tools with an external hydraulic source.

The drive unit A1; A2; A3 comprises different working steps that can be switched from each other. With the assistance of these switchable working steps, different operating stages of the drive unit A1; A2; A3 can be set that are assigned to the respective stage of a joining process. It is thereby preferably taken into account that a faster punch speed is needed to advance or retract the punch in certain stages of the joining process. In another phase of the joining process, a greater punch force is needed in turn since, at this stage, the joining element or preferred functional element must be set in the components. Correspondingly, it is preferable according to at least some embodiments of the present invention for the single operating drive unit A1; A2; A3 to have at least one movement step and at least one power step. In the context of the movement step, the punch can be displaced at a higher punch speed in the joining direction $R_F$, or opposite the joining direction. In a preferred power step, a strong force can be exerted by the punch on the at least one component at a lower punch speed in comparison to the movement step. In this context, it is also preferable to provide a plurality of movement steps with different maximum achievable punch speeds, and a plurality of power steps with different maximum achievable punch forces corresponding to the joining task to be realized, between which can be intentionally switched.

The preferred drive unit A1; A2; A3 is always used in combination with a clamping device module N. The clamping device module N serves to identify specific phases of a joining process at which a switchover between working steps of the drive unit A1; A2; A3 must occur. The construction and the mode of operation of the clamping device module N specifically in combination with the single operating drive unit A1; A2; A3 will be explained further below.

To realize a preferred multistep drive unit A1, the joining device in FIG. 1 comprises an electric motor E, a multistep gear unit G, and a spindle drive S. A similar design is described in DE 10 2014 200 962 and in DE 2010 6 207 U1, of which the drive unit design is hereby incorporated by means of reference. A drive unit with an electric motor, a gear unit and two spindles with a different thread pitch can also be used as another preferred embodiment. These two spindles are preferably arranged coaxially nested, or next to each other or over each other in the drive unit.

The aforementioned gear unit of the joining device in FIG. 1 is preferably designed with at least two steps. This means that a movement step with a fast spindle speed is provided, and accordingly a spindle speed in a linear direction, or respectively in the joining direction. It is also preferable to realize a plurality of movement steps. A working step that is also provided enables a slower spindle and consequently punch speed, whereas at the same time, a greater punch force is transmitted to the punch and components. Consequently, the at least one movement step is used for advancing the punch toward the component, and for removing the punch from the component. If the movement step is used to set the position of the punch during the joining process, this reduces the cycle times for the joining process. The movement step is switched to the at least one working step once the phase of actual connecting during the joining process starts, or shortly beforehand. This time is the moment at which a self-piercing rivet lies on the component but has not yet penetrated said component or, in clinching, a deformation of the components has not yet started.

The joining device in FIG. 1 moreover comprises the above-mentioned clamping device N (see below), the die M, as well as a preferred central control unit K. The central control unit K collects the joining parameters transmitted by sensors such as for example the load, i.e., punch force, hydraulic pressure, punch path, joining time, etc., and evaluates the joining process. According to an embodiment of the present invention, the central control unit K controls the drive unit A2 and the switchover between the drive steps for configuring the joining process.

The punch force and punch path are detected using known sensors. Since preferably the clamping device also moves toward the components with the assistance of the punch movement and is placed thereupon, the force supplied by the clamping device is preferably detectable by the punch force. It is also preferable to move the clamping device with its own drive and individually detect its load.

FIG. 1 also discloses a coupling module B that is attached to the C-frame C. The joining device in FIG. 1 can be coupled to a robot arm with the assistance of the coupling module B.

In contrast to the drive unit A1 in FIG. 1, the joining device in FIG. 2 preferably uses a hydraulic drive unit A2. According to a preferred embodiment, another preferable hydraulic drive unit A3 is illustrated in FIG. 3.

The aforementioned hydraulic drive units A2; A3 are independently operable modules that can be operated independent of a remotely-arranged hydraulic source, and without long hydraulic hoses connected to this source. Instead, the hydraulic drive units A2; A3 comprise a hydraulic reservoir R in which sufficient hydraulic fluid is stored to operate the drive unit A2; A3.

Moreover, the hydraulic drive units A2; A3 preferably comprise a hydraulic cylinder Z, preferably a dual-acting cylinder. A piston rod of the hydraulic cylinder Z is deflected in a known manner by the infeed and outflow of hydraulic fluid in a linear direction, which causes the punch movement.

Furthermore, the hydraulic drive unit A2; A3 comprises a hydraulic pump P. The hydraulic fluid conveyed by the hydraulic pump P is conducted through a valve block V in order to feed the volumetric flows of hydraulic fluid specifically to the cylinder, or to remove them therefrom. According to a preferred embodiment, the hydraulic pump is driven by an electric motor. Depending on the design and application, a plurality of hydraulic pumps P1, P2 have different outputs so that a plurality of pumps are also combined with each other in a hydraulic drive unit. More preferably, the hydraulic pump is driven by a servomotor SA. The servomotor SA has the advantage that it can operate the pump at different speeds, stepwise and at different rotational directions. Correspondingly, the servomotor SA increases the flexibility of the electrohydraulic drive unit in order to be able to react to practical situations. If the motor current of the servomotor is detected that represents the input power into the pump, then the motor current can be used as a reference value for the force applied by the punch and clamping device, or respectively for the load on the joining device.

As already mentioned above, the hydraulic cylinder Z is preferably a dual-acting cylinder that is operated as a differential cylinder according to one embodiment. This means that the volumetric flows operating the dual-acting cylinder Z are conducted to the cylinder Z based on a differential switching system (see FIG. 6). In the dual-acting differential cylinder Z, the piston rod is only arranged in a working chamber of the cylinder. If the piston is shifted in the joining direction $R_F$, the hydraulic fluid is displaced from the piston-rod-side working chamber. With the assistance of the differential switching system, the displaced volumetric flow is deflected from the piston-rod-side working chamber directly into the working chamber without a piston rod without directing the volumetric flow beforehand to the tank T. At that location, the volumetric flow is added to the volumetric flow that is supplied by the hydraulic pump P. Given the volumetric flow of hydraulic fluid which is increased in this manner, the piston and the associated punch (not shown) are moved faster in the joining direction $R_F$. Accordingly, the differential switching system in the movement step serves to reach the appropriate punch position in order to advance the punch to the components A as quickly as possible, i.e., with minimal time.

It is also preferable to use a cylinder with a two-sided piston rod (not shown). In the cylinder, the two piston rods have different diameters, and this yields different size piston areas. These function similar to a differential cylinder.

To monitor the drive unit A2; A3, a pressure sensor D is preferably arranged at the cylinder Z. This detects the pressure of the hydraulic fluid. When the cylinder Z is operated in the preferred differential switching system, the pressure in the two working chambers of the cylinder is ideally approximately the same size. Whereas the force applied by the punch is detectable by a force sensor, it is also preferable to derive the force applied by the punch from the hydraulic pressure detected by the pressure sensor D.

It is moreover preferable to detect the movement of the piston rod of the cylinder Z using a path transducer W. Since the piston rod of the cylinder Z is connected to the punch of the joining device, the punch path of the joining device can be inferred from the path of the piston rod.

Depending on the joining task to be accomplished, all or only a selection of the aforementioned sensors are used in combination with the joining device.

If the hydraulic cylinder Z is not operated by a differential switching system DF (see FIG. 4) but rather only by a hydraulic pump P, the volumetric flows of the hydraulic fluid move according to the schematic representation in FIG. 5. FIG. 4 shows the dual-acting cylinder Z. Since the piston rod only extends into one working chamber, the piston has two different size piston areas A1 and A2. The piston areas A1 and A2 have a size ratio of 2:1 according to a preferred embodiment. The pump P delivers hydraulic fluid from the tank T into the working chamber of the dual-acting cylinder Z facing away from the piston rod. Since the two working chambers of the dual-acting cylinder are only connected to each other by the pump P, and the pump P has a maximum delivery volume of 10 L/min, the adjustment speed of the piston is thereby limited.

FIG. 5 shows a schematic representation of the dual-acting cylinder in a differential switching system. The pump P and the tank are provided with hydraulic fluid T in this differential switching system in the same manner as in FIG. 4. Here as well, the pump has a maximum delivery volume of 10 L/min. In contrast to the switching system in FIG. 4, the piston-rod-side working chamber in FIG. 5 is connected to the top working chamber without a piston rod. This means that in the method of the piston hydraulic is displaced in joining direction $R_F$ out of the piston-rod-side working chamber and is diverted into the working chamber without the piston rod. In this manner, the volumetric flow of hydraulic increases, that flows into the working chamber without the piston rod. In comparison to the switching system in FIG. 5, this switching system has the advantage that the volumetric flow can be increased in the working chamber without the piston rod despite the limited delivery volume of the pump P. This enables a faster piston adjustment speed in the joining direction $R_F$. It should however be noted that high punch forces are not feasible with the high volumetric flow. The piston rod is therefore moved quickly as desired in the movement step; however, the desired hydraulic pressures for the necessary punch force while joining cannot be generated with this switching system. To do this, there is a switch to the power step.

According to another embodiment of the joining device, two pumps P1 and P2 are used to operate the drive unit A3 (see FIG. 3) instead of the differential switching system of the hydraulic cylinder Z or a differential cylinder. The two pumps P1, P2 are designed to realize a quick displacement of the punch, i.e., the movement step, with the assistance of a high volumetric flow of hydraulic fluid. The aforementioned power step of the joining device is realized with a low volumetric flow of hydraulic fluid and a correspondingly designed hydraulic pump. This ensures a sufficient punch force for connecting the components with each other at the end of a joining process.

To emphasize the advantages of a differential switching system for operating a hydraulic cylinder Z, FIG. 6 shows a schematic diagram in which the punch path of a joining device is plotted over time. Whereas the traveled punch path is plotted on the y-axis, the required joining time is plotted on the x-axis. The two depicted curves rise linearly up to a maximum. Briefly before the maximum is reached, a self-piercing rivet, for example, penetrates the components A to be connected to each other and establishes a corresponding connection. The punch movement necessary for this joining process was realized according to the curve on the right with a known joining device that is only driven by a single hydraulic pump without a differential switching system. The joining curve on the left in the diagram in FIG. 6 depicts a traveled punch path which was realized with a drive unit with a differential switching system, or with a drive unit with controlled switching that works in two steps. This controlled switching is carried out between two hydraulic pumps P1, P2 (see above), or electronically in a two-step gear unit, or by two spindles with a different thread pitch. In light of the offset of the two curves on the time axis, it is clearly discernible that the differential switching system (see above) or the switchover controlled by a clamping device module ensures faster punch speeds and hence shorter punch delivery times. Correspondingly, the cycle time for establishing a joint is shortened. The first curve in FIG. 6 moreover shows two descending legs. The dashed line describes the return stroke of the piston in a differential switching system. In this case, the return stroke cannot be accelerated in the same manner as the delivery. Consequently, the return stroke also has a similar slope like the second curve without a differential switching system. The dot-dashed line of the first curve shows an alternative return stroke. This accelerated return stroke is realized by the drive unit with two hydraulic pumps P1, P2, or two different pump steps. With the return stroke as well, both pumps can accordingly achieve a high volumetric flow similar to the delivery. As already mentioned above, the joining device is equipped with the clamping device module N. In a known manner, the clamping device module N pretensions the components against a die M or a counterbearing to fix them while connecting the components, or during a setting process.

The clamping device module N comprises the sleeve-like clamping device 10. The clamping device 10 forms a joining channel for the punch 3 and/or for the joining element 1, a self-piercing rivet. Once the joining device is moved toward the components A to be connected, the clamping device 10 is placed on the components A and starts to compress them (see FIGS. 7A and B). To optimally configure this joining process, at least one first spring 20 and one second spring 30 are arranged within the clamping device module N. The first spring 20 preferably has a smaller spring constant than the second spring 30.

When the joining device is advanced toward the components A, the weak first spring 20 functions as a spreading spring. The pretension of the first spring 20 ensures that the clamping device 10 precedes the punch 3 by a definite length independent of the position. Moreover, this ensures that the joining element 1 can also be supplied by the element supply 5 even when the tool is partially open. Once the clamping device N leaves the component K, a window opens on the side for supplying the rivet (see FIG. 7A). In the process, the bottom side of the punch preferably forms part of the rivet guiding surface.

A clamping device mechanism and a punch mechanism are arranged within a clamping device sleeve 7 which are guided in a housing 9. The housing 9 serves to transfer the punch force to be applied between the C-frame C and the drive unit A1; A2; A3.

Once the clamping device 10 lies on the at least one component A, a relative force arises between the unit consisting of the clamping device 10, setting head SK, adapter 15 and the punch piston 13. This compresses the first spring 20. At the same time, the punch 3 displaces the joining element 1 in the clamping device 10 to at least one component A. The spring force of the first spring 20 is preferably selected so that a force-regulated multi-step drive unit A1; A2; A3 is not switched from the movement step to the power step (see below).

During the joining process, a force sensor detects the force acting on the punch 3. Since the clamping device 10 abuts the punch 3 and is advanced by the punch piston 13 and the intermediate springs 20, 30, the force sensor also detects forces applied by the clamping device 10. If there is no force sensor, the load on the punch 3 and clamping device 10 is preferably also detected by the pressure sensor D. Just like a force sensor, this supplies the load from the punch 3 and/or the clamping device 10 by means of the hydraulic pressure in the cylinder Z, preferably by the hydraulic pressure in the working chamber of the cylinder Z without the piston rod.

If the phases of the joining process according to FIGS. 7A and B in the force/load punch path diagram in FIG. 9 are considered, the force/load punch path curve shows an initial constant rise in the positive direction on the x-axis and after the origin of the ordinates. The traveled punch path S is plotted on the x-axis, whereas the load in the form of the punch force F is plotted on the y-axis. This first constant rise corresponds to the rise of the dashed line F20 that represents a force/path curve of the first spring 20 by itself. This dashed line F20 can also be termed a spring characteristic for the first spring 20. Since the first spring 20 prefers to obey Hooke's law, the rise in the dashed line F20 corresponds to the spring constant of the first spring 20.

According to FIG. 7C, the punch piston 13 is moved toward component A. This completely compresses the first spring 20. Then the punch piston 13 contacts the driver 32 to compress the second spring 30 in another movement in the joining direction $R_F$.

In the force/punch path diagram in FIG. 9, the initial compression of the second spring 30 causes a jump S30, the slope of which preferably reflects the rigidity of the C-frame C. This slope corresponds to the slope of the descending curve on the right edge of the picture in FIG. 9. After this jump S30, the force/punch path curve runs on a combined spring characteristic $F_{20+30}$ that results from the two spring characteristics of springs 20 and 30. Preferably, the second spring 30 is stronger than the first spring 20 so that the linear rise after jump S30 is greater than before. The jump S30 would however also be discernible if the spring constant of both springs 20, 30 were the same.

Since the axial length of the individual components of the clamping device module N such as the clamping device 10, punch 3, and punch piston 13 is preferably known in a compressed state, the distance of the bottom side of the punch to the component A can be inferred from the jump S30. If a length is known of a joining element 1 to be set, for example a self-piercing rivet, the central control unit K preferably calculates the punch path S yet to be achieved, or respectively the punch path section yet to be traveled after which the joining element 1 contacts the component A.

Before the joining element 1 contacts the component A, the punch 3 can move in the at least one movement step of drive unit A1; A2; A3. This is because within this phase of the joining process, a small punch force is sufficient to move, or respectively advance the joining element 1 toward the component A. Instead, a faster punch speed, preferably within a range of 150-1000 mm/s in the joining direction is advantageous for effective cycle times of the joining process. For riveting, or respectively producing a joint, preferably punch speeds within a range of 10-150 mm/s in the power step are used. Therefore a switchover point $U_{1,S}$ or $U_{1,F}$ is preferably set at a certain punch path S or a certain punch force, or respectively clamping device force F at which the joining element 1 to be set is advanced just up to the surface of the component A. This switchover point $U_{1,S}$, or respectively $U_{1,F}$ is saved in the central control unit K and is recognized while detecting the load/punch path or load/ joining time data. Correspondingly at the detected switchover point $U_{1,F}$, $U_{1,S}$, the multi-step drive unit A1; A2; A3 is switched from the movement step to the power step (see above).

The switchover point $U_1$ to the power step is the point at which the driver 32 starts to compress the second spring 30. The second spring 30 is pretensioned by the adapter 15 to a specific force while the clamping device 10 abuts the component A. This force corresponds to the clamping device force at the beginning of the setting process.

As an alternative switchover point to the power step, a point is selected that is just before the longest joining element 1 to be processed is applied. This ensures that sufficient clamping device force is applied at the beginning of the connecting or pressing-in process. The switchover point $U_{1,S}$ lies within a range in which the self-piercing rivet or the joining element is still distant from component A within a range of 0 to 20 mm, preferably 0.5 to 5 mm.

The switchover points $U_{1,S}$ and $U_{1,F}$ are definable within the range of the punch path S in the same manner as the load range of the punch 3 and the clamping device 10. Moreover, the switchover points $U_{1,S}$, $U_{1,F}$ are preferably defined as threshold values. They accordingly form a load threshold value, preferably as a force value, hydraulic pressure or pneumatic pressure. Alternatively, the values of the punch path form corresponding punch path threshold values. If these threshold values are exceeded, the drive unit A1; A2; A3 is switched from the movement step to the power step by a control signal from the central control unit. If there are a plurality of movement and/or power steps, it is also preferable to define a plurality of switchover points $U_n$. Moreover, these switchover points are preferably defined for the return stroke of the punch. However, this does not apply when the differential switching system is used since the differential switching system can only be used to accelerate the punch during the advancement toward component A.

The joining process is over once the joining element has been pressed into the laminated core, or respectively the components A. This is accomplished either force-regulated, path-regulated by differential measurement between the clamping device 10 and punch 3, or by a stop. Within the differential measurement, the position of the punch area in the joining direction is compared with the position of the clamping device surface. If the positions are the same, or respectively the difference between both positions is zero, the joining element sat flush. Since preferably a maximum joining force and/or a maximum joining punch path is traveled in the central control unit K, the central control unit preferably ascertains the end of the joining process. Correspondingly, it is no longer necessary for the drive unit A1; A2; A3, to have to move clamping device 10 and punch 3 in the power step. Rather, for a short cycle time and consequently effective joining process, the drive unit A1; A2; A3 is switched to the movement step in order to ensure a punch return stroke at a high punch speed. This cannot be used in combination with a differential switching system. With this return stroke of the punch 3, the second spring 30 and first spring 20 then relax sequentially. Once the clamping device 10 has released from the component A, the next joining element 1 can be targeted by the supply 5 of the joining elements from the joining device.

According to another embodiment of the joining device, a clamping device module N is used that is equipped with only one spring (not shown). As a result, only a linear rise with a constant value is discernible within the load/punch path curve before the actual connecting process occurs (see FIG. 8). Effective switchover points $U_{1,F/S}$ can be defined in this clamping device configuration as well since, with regard to such a clamping device module N, one can define the punch path after which the joining element 1 is arranged just before the surface of the component A, and the load, or respectively punch force at which the actual connecting process is just about to start. In the same manner as according to the above description, the switchover points are established by threshold values, the exceeding of which is detected by the control unit K. Based on the detection of when the threshold values $U_{1,F/S}$ are exceeded, the control unit K controls a switchover of the respective drive unit A1; A2; A3 from the movement step to the power step. After the joining process has ended, the drive unit A1; A2; A3 is switched from the power step to the movement step corresponding to the return stroke of the punch. This cannot be used with the differential switching system.

According to another embodiment, the independently, or respectively automatically switching control unit is used instead of the central control unit that works in combination or based on evaluated sensor data. This will be described with reference to an example of a joining device having an electrohydraulically operating drive unit (see above).

In the electrohydraulically driven joining device, the load from the punch and clamping device is determined by the hydraulic pressure in the working chamber without the piston rod. The force applied to the punch and clamping device can be inferred from this hydraulic pressure. A mechanically preset switching unit or a mechanically preset switching valve is provided in the valve block V of the electrohydraulic drive unit A2; A3. This switching unit is preconfigured with reference to a load threshold value, the hydraulic pressure in this case. Preferably a switchable tappet is spring-loaded in the switching unit against the hydraulic pressure in the working chamber without a piston rod of the hydraulic cylinder. The strength of the spring bias is adjusted so that it corresponds to the above-described load threshold value $U_{1,F}$.

If the hydraulic pressure in the hydraulic cylinder preferably therefore reaches a level that signals a sufficient compression of only one or more clamping device springs 20, 30 before the joining element, preferably a self-piercing rivet in this case, is pressed into the components A, then the hydraulic pressure displaces the switchable tappet against its spring bias, i.e., it switches the switching unit within the electrohydraulic drive unit.

Before reaching the threshold value or the switching point, the switching unit establishes that the electrohydraulic drive unit A2; A3 is working in the at least one movement step. Upon reaching the switching point, the switching unit switches to the power step of the electrohydraulic drive unit A2; A3. Since the switching unit is mechanically preconfigured, the switchover is automatic without detecting and evaluating sensor data. The control unit is independently-switching and preconfigured and controls the working steps of the drive unit A2; A3 without exchanging electric signals.

Once the joining process is over, the hydraulic pressure is reduced to below the threshold value during the return stroke of the punch. Correspondingly, the spring bias of the switching unit ensures a switchover from the power step to the movement step of the electrohydraulic drive unit A2; A3.

FIG. 11 A, B shows a further embodiment of the electrohydraulic drive unit A2 in combination with the control unit U that automatically switches depending on the hydraulic pressure. The hydraulic circuit diagram is schematically depicted in FIG. 11 A when the hydraulically-operating setting cylinder Z is driven by an electrohydraulic drive unit A2 with a differential switching system. At the left edge of the picture, the hydraulic cylinder Z can be seen with a piston-rod-side and piston-rod-free working chamber. The hydraulic fluid for operating the hydraulic cylinder Z is pumped by the preferred servomotor SA from the hydraulic reservoir R to the hydraulic cylinder Z.

The valve block V comprises a differential switching system. In the portrayed movement step, this connects the piston-rod-side working chamber with the piston-rod-free working chamber to increase the volumetric flow of hydraulic fluid into the working chamber without a piston rod when the punch is advanced. At the same time, this increases the punch speed of the hydraulic cylinder. The switching unit U that causes the valve block V to switch from the movement step (FIG. 11 A) to the power step (FIG. 11 B) in the context of differential switching is controlled by the hydraulic pressure in the hydraulic system. This hydraulic pressure that the pump generates with the servomotor SA is approximately the same everywhere in the hydraulic system. If, while the punch is advancing toward the components A, the first and/or second clamping device spring 20, 30 is/are compressed, the hydraulic pressure in the hydraulic system rises correspondingly. If the hydraulic pressure in the hydraulic system exceeds a preselected threshold value for the hydraulic pressure that is set in the switching unit by spring bias, etc., then the switching unit switches to the power step under pressure (FIG. 11 B). In the power step, the volumetric flow of the piston-rod-side working chamber flows to the pump and is pumped into the working chamber without a piston rod. In addition, hydraulic fluid is removed from the hydraulic reservoir R and is also pumped by the pump into the working chamber without a piston rod in order to balance the piston rod volume.

The servomotor SA pumps the hydraulic fluid directly into the working chamber without a piston rod. In this context, it is advantageous that the servomotor SA driving the pump can vary its speed as desired and can also move stepwise. This ensures that the pressure is controlled by the servomotor SA in a variable manner depending on the joining instance, which is generally advantageous when using the servomotor SA in combination with a pump.

According to another embodiment, a preconfigured and independently-switching control unit can also be realized depending on the punch path. To this end, a punch path threshold value is electronically or mechanically preconfigured in a provided position sensor. Once this preconfigured punch path threshold value is reached by the punch, or respectively is passed by the punch, the control unit independently, or respectively automatically switches between the working steps of the drive unit. The drive unit A1; A2; A3 can work electrohydraulically, pneumatically or electromotively. If the drive unit A1; A2; A3 is in an advancing stroke in the joining direction, the automatic control unit automatically switches from the movement step to the power step. If the drive unit A1; A2; A3 is in a return stroke, the control unit automatically switches from the power step to the movement step. This cannot be used in combination with the differential switching system.

Accordingly, a threshold value is mechanically or electrically set within the switching unit, preferably in the context of preconfiguration. During the joining process, the preconfigured threshold value is compared with the real value automatically in the independently-switching preconfigured control unit. Once the real value, preferably of the hydraulic pressure in the hydraulic cylinder or the punch path, reaches the threshold value, the control unit automatically switches between working steps of the drive unit A1; A2; A3.

REFERENCE NUMBER LIST

A Component
C C-frame
G Gear unit
E Electric motor
S Spindle drive
A1 Electromechanical drive unit
M Die
N Clamping device
K Control unit
B Coupling element
R Hydraulic reservoir
P Hydraulic pump
U Automatic, independently-switching control element
V Valve block
Z Hydraulic cylinder
A2; A3 Electrohydraulic drive unit
SA Servodrive
P1, P2 Hydraulic pump steps
D Pressure sensor
W Path transducer
A3 Electrohydraulic drive unit with at least one first and one second hydraulic pump P1, P2, SA
A4 Electrohydraulic drive unit with a hydraulic differential switching system
$R_F$ Joining direction
1 Joining or functional element
3 Punch
5 Supply for joining elements
7 Clamping device sleeve 9 Housing
10 Clamping device
20 First spring
30 Second spring
13 Punch piston
15 Adapter
SK Setting head
S30 Jump in force/punch path curve
F20 Spring characteristic of the first spring
F20 Spring characteristic of the second spring
32 Driver

The invention claimed is:

1. A joining device, comprising:
a punch with which a linear, nonrotating setting movement can be executed,
a clamping device with which one or more components can be compressed in a joining direction, and with
a drive unit that operates in at least two steps with which the punch and the clamping device can be moved, and that can be switched over depending on a force that can be applied by the punch and/or the clamping device, and/or depending on a realizable punch path, and/or a clamping device path, and/or a joining time and/or an electrical motor current of a pump, wherein the drive unit has:
   a. an at least two-step electrical spindle drive in which a gear unit converts a rotary movement of an electric motor into a linear setting movement of the punch by at least two switchable different transmission steps, or two spindles with different thread pitch, wherein the respective linear setting movement of the at least two switchable different transmission steps differs in terms of possible setting paths per unit time and/or in terms of an applicable punch force, and at least the electric motor, the gear unit which is switchable and the at least two-step electrical spindle drive form a single operating module, or
   b. an at least two-step hydraulic punch drive with a dual-acting cylinder having a one-sided piston rod, a hydraulic reservoir, an electric motor connected to a first and a second step of a hydraulic pump and a valve block which together form a single operating module, in the first step of which a high volumetric flow with a low hydraulic pressure in comparison to the second step can be provided, and in the second step of which a low volumetric flow with high hydraulic pressure can be provided, or
   c. an at least two-step hydraulic punch drive with a dual-acting cylinder having a one-sided piston rod, a hydraulic reservoir, an electric motor connected to a hydraulic pump and a valve block which together form a single operating module, the dual-acting cylinder being operable as a differential cylinder by the valve block so that, in a first step of the at least two-step hydraulic punch drive, a high volumetric flow with a low hydraulic pressure in comparison to a second step of the at least two-step hydraulic punch drive can be provided, and in the second step of the at least two-step hydraulic punch drive, a lower volumetric flow with high hydraulic pressure can be provided,
in which furthermore the following is provided:
   at least one load sensor so that a mechanical load on the punch and the clamping device in the joining direction can be detected, and
   a path transducer so that the punch path and/or the clamping device path can be detected, and/or
   a time recorder so that a joining time can be detected, wherein
   the clamping device can be moved by the punch so that the mechanical load on the clamping device or on the one or more components can be detected by the at least one load sensor, while the clamping device can be pretensioned by at least one first spring by a movement of the punch against the one or more components, wherein
   reaching at least one first threshold value of the mechanical load on the punch and/or the clamping device is discernible by at least one control unit by itself or in combination with the at least one load sensor, or
   reaching at least one first threshold value of the punch path can be recognized by at least one control unit by itself or in combination with the path transducer, or
   reaching at least one first threshold value of the joining time is discernible by at least one control unit by itself or in combination with the time recorder, after which the drive unit that operates in at least two steps is switchable by the at least one control unit between the at least two steps that comprise at least one movement step and at least one power step, of which the at least one movement step is distinguished by a faster punch speed in comparison to the at least one power step, and the at least one power step is distinguished by a greater applicable punch force in comparison to the at least one movement step.

2. The joining device according to claim 1 in which the at least one control unit in combination with the at least one load sensor detects an increased load with a constant rise, over a course of which the at least one first threshold value of the mechanical load is defined.

3. The joining device according to claim 2 in which the increased load is evaluatable by the at least one control unit depending on the punch path or the joining time.

4. The joining device according to claim 3 in which the mechanical load is discernible as a punch force, as a hydraulic pressure, or as a pneumatic pressure.

5. The joining device according to claim 3 in which a change in the increased load from a first positive constant rise to a second positive rise is detectable by the at least one control unit in combination with the at least one load sensor, wherein the first positive constant rise is smaller than the second positive rise, and based on an increase in the rise, the drive unit can be switched from the at least one movement step to the at least one power step.

6. The joining device according to claim 5 in which the clamping device has a second spring by which the clamping device can be pretensioned against the one or more components, and that has a greater spring constant than that of the at least one first spring, and in which the second positive rise detected is constant and is based on an effect of the second spring of the clamping device.

7. The joining device according to claim 1 in which the clamping device has a second spring by which the clamping device can be pretensioned against the one or more components, and that has a greater spring constant than that of the at least one first spring.

8. The joining device according to claim 1 that has an independently-switching control unit that switches between the at least two steps of the drive unit based on a mechanical configuration depending on the mechanical load, or depending on at least one of the punch path or the clamping device path.

9. The joining device according to claim 1, wherein the joining device is a self-piercing rivet tool that has the at least two-step hydraulic punch drive as the drive unit, and in which a mechanically preset switching valve forms the at least one control unit for switching the drive unit between the at least one movement step and the at least one power step that switches from the at least one movement step to the at least one power step and vice versa depending on the hydraulic pressure.

10. A joining method of a joining device according to claim 1, in which a punch executes a linear, nonrotating setting movement, a clamping device compresses one or more components in a joining direction, and a drive unit that operates in at least two steps can move the punch and the clamping device, and that is switched depending on a force that can be applied by the punch and/or the clamping device, and/or depending on a realizable punch path, and/or a joining time, wherein the drive unit has:
   a. an at least two-step electrical spindle drive in which a gear unit converts a rotary movement of an electric motor into a linear setting movement of the punch by at least two switchable different transmission steps, or two spindles with different thread pitch, wherein the respective linear setting movement of the at least two switchable different transmission steps differs in terms of possible setting paths per unit time and/or an applicable punch force, and at least the electric motor, the gear unit which is switchable and the at least two-step electrical spindle drive form a single operating module, or
   b. an at least two-step hydraulic punch drive with a dual-acting cylinder having a one-sided piston rod, a hydraulic reservoir, an electric motor connected to a first and a second step of a hydraulic pump and a valve block which together form a single operating module, in the first step of which a high volumetric flow with a low hydraulic pressure in comparison to the second step can be provided, and in the second step of which a low volumetric flow with high hydraulic pressure can be provided, or
   c. an at least two-step hydraulic punch drive with a dual-acting cylinder having a one-sided piston rod, a hydraulic reservoir, an electric motor connected to a hydraulic pump and a valve block which together form a single operating module, the dual-acting cylinder being operable as a differential cylinder by the valve block so that, in a first step of the at least two-step hydraulic punch drive, a high volumetric flow with a low hydraulic pressure in comparison to a second step of the at least two-step hydraulic punch drive can be provided, and in the second step of the at least two-step hydraulic punch drive, a lower volumetric flow with high hydraulic pressure can be provided, wherein
at least one load sensor detects a mechanical load on the punch and/or the clamping device in the joining direction as a load signal, and
with a path transducer by which the punch path and/or the clamping device path is detected, and/or
a time recorder by which a joining time is detected, wherein the clamping device is moved by the punch while the clamping device is pressed against the one or more components via at least one first spring by a punch movement, and reaching at least one first threshold value of the mechanical load on the punch and/or the clamping device is discernible by at least one control unit by itself or in combination with the at least one load sensor, or reaching at least one first threshold value of the punch path and/or the clamping device path is discerned by at least one control unit by itself or in combination with the path transducer, or reaching at least one first threshold value of the joining time is discerned by at least one control unit by itself or in combination with the time recorder, then the drive unit that operates in at least two steps is correspondingly switched by the at least one control unit between the at least two steps, in which the at least two steps comprise at least one movement step and at least one power step in which the at least one movement step is distinguished by a faster punch speed in comparison to the at least one power step, and the at least one power step is distinguished by a greater applicable punch force in comparison to the at least one movement step.

11. The joining method according to claim 10 in which the at least one control unit by itself or in combination with the at least one load sensor detects an increased load over a course of which the at least one first threshold value of the mechanical load is defined.

12. The joining method according to claim 11 in which the at least one control unit by itself or in combination with the at least one load sensor evaluates the increased load depending on the punch path or the joining time.

13. The joining method according to claim 12 in which the at least one control unit by itself or in combination with the at least one load sensor detects a change from a first positive constant rise to a second positive rise in the increased load, wherein the first positive constant rise is smaller than the second positive rise, and based on an increase in the rise, the drive unit is switched from the at least one movement step to the at least one power step.

14. The joining method according to claim 13 in which the clamping device has a second spring by which the clamping device is pretensionable against the one or more components, and that has a greater spring constant than that of the at least one first spring, and in which the second positive rise detected by the control unit is constant and is based on an effect of the second spring of the clamping device.

15. The joining method according to claim 11 in which the mechanical load is detected as a punch force, as a hydraulic pressure, as a motor current of the hydraulic pump, or as a pneumatic pressure.

16. The joining method according to claim 12 in which the mechanical load is detected as a punch force, as a hydraulic pressure, as a motor current of the hydraulic pump, or as a pneumatic pressure.

17. The joining method according to claim 10 in which the mechanical load is detected as a punch force, as a hydraulic pressure, as a motor current of the hydraulic pump, or as a pneumatic pressure.

18. The joining method according to claim 10 in which the clamping device has a second spring by which the clamping device is pretensionable against the one ore more components, and that has a greater spring constant than that of the at least one first spring.

19. The joining method according to claim 10 in which an independently-switching control unit is provided that switches between the at least two steps of the drive unit based on a mechanical configuration depending on the mechanical load, or depending on at least one of the punch path or the clamping device path.

20. The joining method according to claim 10 in which the at least two-step hydraulic punch drive is switched by a mechanically preset switching valve as the at least one control unit when a hydraulic pressure in the at least two-step hydraulic punch drive has reached a threshold value of a hydraulic working pressure.

\* \* \* \* \*